United States Patent
Mukai et al.

[11] Patent Number: 5,903,788
[45] Date of Patent: *May 11, 1999

[54] CAMERA

[75] Inventors: Hiromu Mukai; Katsuto Tanaka, both of Kawachinagano; Jun Ishihara, Kobe; Ichiro Tsujimura, Higashiosaka, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/702,993

[22] Filed: Aug. 26, 1996

Related U.S. Application Data

[63] Continuation of application No. 08/176,552, Jan. 3, 1994, abandoned.

[30] Foreign Application Priority Data

Jan. 7, 1993 [JP] Japan .................... H5-001397

[51] Int. Cl.$^6$ .................................................. G03B 13/02
[52] U.S. Cl. ............................................ 396/373; 396/282
[58] Field of Search ...................................... 396/373, 282

[56] References Cited

U.S. PATENT DOCUMENTS

| | | | |
|---|---|---|---|
| 3,724,349 | 4/1973 | von Belvard et al. | 95/44 R |
| 4,208,115 | 6/1980 | Proske | 354/201 |
| 4,441,798 | 4/1984 | Watanabe et al. | 354/483 |
| 4,494,853 | 1/1985 | Watanabe | 354/478 |
| 4,534,639 | 8/1985 | Konishi et al. | 354/432 |
| 5,333,031 | 7/1994 | Mukai | 354/442 |

FOREIGN PATENT DOCUMENTS

| | | |
|---|---|---|
| 57-124331 | 8/1982 | Japan . |
| 57-37854 | 8/1982 | Japan . |
| 61-60420 | 12/1986 | Japan . |
| 2-20844 | 1/1990 | Japan . |
| 3-181922 | 8/1991 | Japan . |

*Primary Examiner*—Russell E. Adams
*Attorney, Agent, or Firm*—Sidley & Austin

[57] ABSTRACT

A subject image is formed on a focusing screen by a taking lens in a camera. The focusing screen is constituted by a liquid crystal whose light diffusion characteristic is variable. The light diffusion characteristic is varied according to an open aperture value of the taking lens which is attached to the camera.

14 Claims, 16 Drawing Sheets

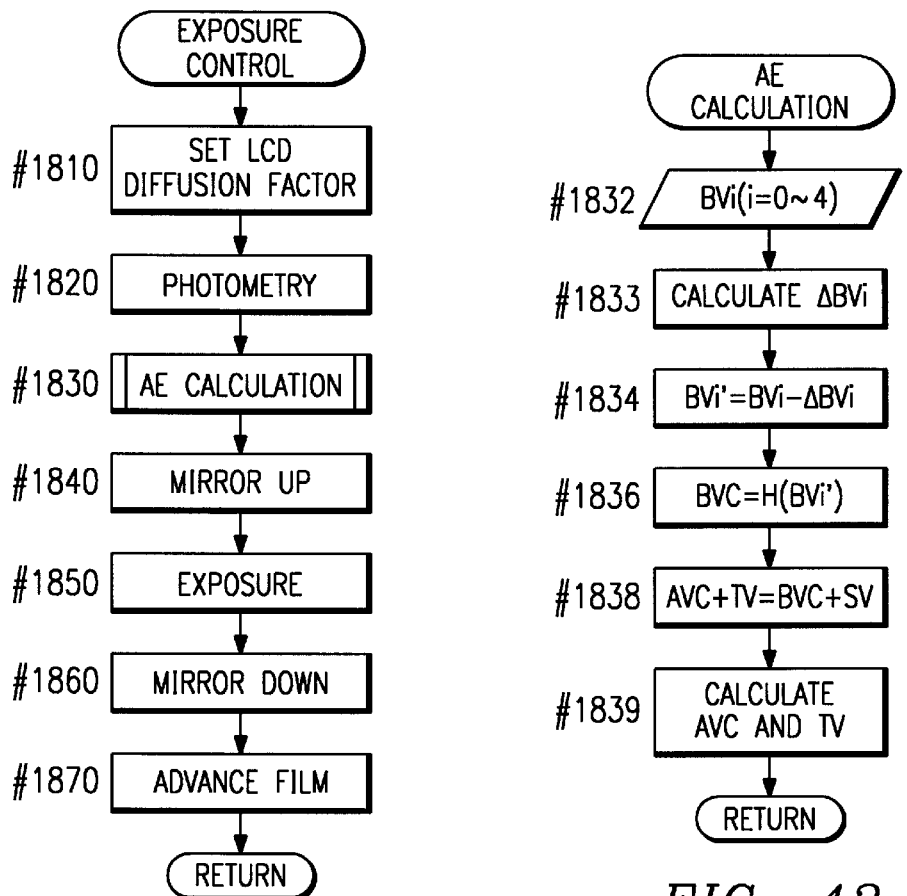
FIG. 42
FIG. 43
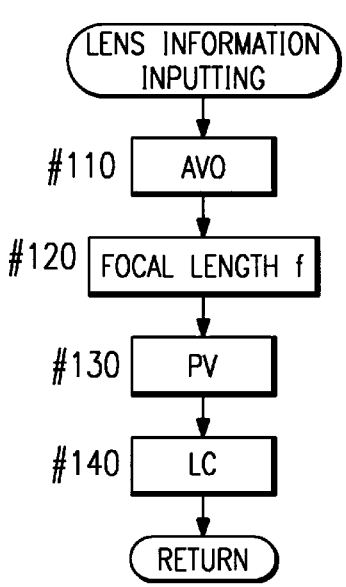
FIG. 44

CAMERA

This application is a continuation of application Ser. No. 08/176,552, filed Jan. 3, 1994 abandoned.

BACKGROUND OF THE INVENTION

1. Field of the Invention

The present invention relates to a camera, and more specifically, to a single-lens reflex camera employing as a focusing screen a liquid crystal having a variable light diffusion characteristic.

2. Description of the Prior Art

FIG. 1 cross-sectionally shows an example of a conventional finder optical system for use in a single-lens reflex camera. A taking lens 20 is a lens group comprising a plurality of lens elements, and includes an aperture stop 21 between the lens elements. Light, having passed through the taking lens 20 and been reflected by a main mirror 22, is formed into an image on a focusing screen 11. The image formed on the focusing screen 11 is viewed at a pupil EP through a pentagonal roof prism 3 and an eyepiece 5.

A photometric lens 7 and a photometric apparatus 8 are arranged close to the eyepiece 5. The photometric lens 7, which forms a decentered optical system in the view finder optical system, directs off-axial light of the image formed on the focusing screen 11 to the photometric apparatus 8. The photometric apparatus 8 performs photometry by use of the off-axial light.

The light having passed through the main mirror, 22 which is a semi-transparent mirror, is reflected by a sub mirror 23 and directed to a focus detection apparatus 24. The focus detection apparatus 24 performs focus detection by use of the light reflected by the sub mirror 23. Film, which is arranged on an extension of an optical axis AX of the taking lens 20, is not shown.

A camera where the light reflected by the sub mirror 23 is used not only for focus detection but also for photometry and a camera where photometry is performed by use of a part of axial light reflected by a beam splitter arranged between the focusing screen 11 and the main mirror 22 are also known (e.g. Japanese Published Utility Model Application No. S55-10982). In this case, photometry is performed by use of axial light having passed through the main mirror 22 by a photometric apparatus provided at a bottom of a mirror box (not shown) in which the main mirror 22 is arranged.

The focusing screen 11 is a plastic plate having very small concaves and convexes on its surface. By diffusing light by means of these concaves and convexes, the brightness of the finder view is secured and an output of the photometric apparatus 8 is increased to increase photometric accuracy. For the same reason, photometry is generally performed before the release operation under a condition where the aperture stop 21 is opened.

In actual photographing, however, since the aperture stop 21 is stopped down based on an optimum value for exposure control or on the user's intention, the depth of field of the picture taken differs from the depth of field confirmed in the finder. For this reason, it is impossible to confirm the depth of field before photographing. A camera is known which has a pre-view function with which the depth of field at an aperture condition at the time of actual photographing can be viewed. With this camera, however, the finder view may become dark or indistinct, or if the aperture value is changed due to an interchange of the taking lens, the way in which the view finder image is viewed may change.

To solve this problem, various types of cameras have been proposed where in order to enable the user to confirm the depth of field for actual photographing through view finder while securing sufficient finder view brightness and an output of the photometric apparatus, a focusing screen made of liquid crystal (hereinafter referred to as "liquid crystal focusing screen") is used instead of the concaves and convexes to vary the degree of light diffusion (e.g. Japanese Laid-open Patent Application No. H2-20844, Japanese Laid-open Patent Application No. H2-72324, Japanese Published Patent Application No. S61-60420, Japanese Laid-open Utility Model Application No. S54-120933, Japanese Laid-open Patent Application No. S57-124331, Japanese Laid-open Patent Application No. S57-109923, Japanese Published Patent Application S57-37854 and Japanese Published Utility Model Application No. S55-10982). Hereinafter, the characteristic of liquid crystal to diffuse light will be referred to as "light diffusion characteristic"; its tendency, as "diffusivity"; and the degree of light diffusion by liquid crystal, as "diffusion factor".

However, since the actual diffusion characteristic of liquid crystal largely differs from an ideal, even if the control f-number is not changed, the depth of field decreases due to flare with a decrease in open aperture f-number of the taking lens, and variation in brightness due to the control aperture value is large.

SUMMARY OF THE INVENTION

An object of the present invention is to provide a camera having a liquid crystal pre-view finder with which the depth of field is accurately confirmed even if the open aperture value is changed due to an interchange of the taking lens.

BRIEF DESCRIPTION OF THE DRAWINGS

This and other objects and features of this invention will become clear from the following description, taken in conjunction with the preferred embodiments with reference to the accompanied drawings in which:

FIG. 42 is a flowchart of an exposure control subroutine (refreshing type) executed in the fifteenth embodiment of the present invention;

FIG. 43 is a flowchart of an AE calculation subroutine (refreshing type) executed in the fifteenth embodiment of the present invention;

FIG. 44 is a flowchart of a lens information inputting subroutine executed in the tenth embodiment of the present invention;

DESCRIPTION OF THE PREFERRED EMBODIMENTS

Hereinafter, embodiments of the present invention will be described with reference to the drawings. The subsequently-described embodiments have no operation member specifically provided to actuate the pre-view function, and are designed so that the pre-view function is automatically performed based on camera information without any need to depress, for example, a pre-view button. Needless to say, an operation member such as the pre-view button may be provided so that the pre-view function is performed only when necessary. In each embodiment, elements the same as and corresponding to those of the prior art and each embodiment are denoted by the same reference designations.

Figure 2:
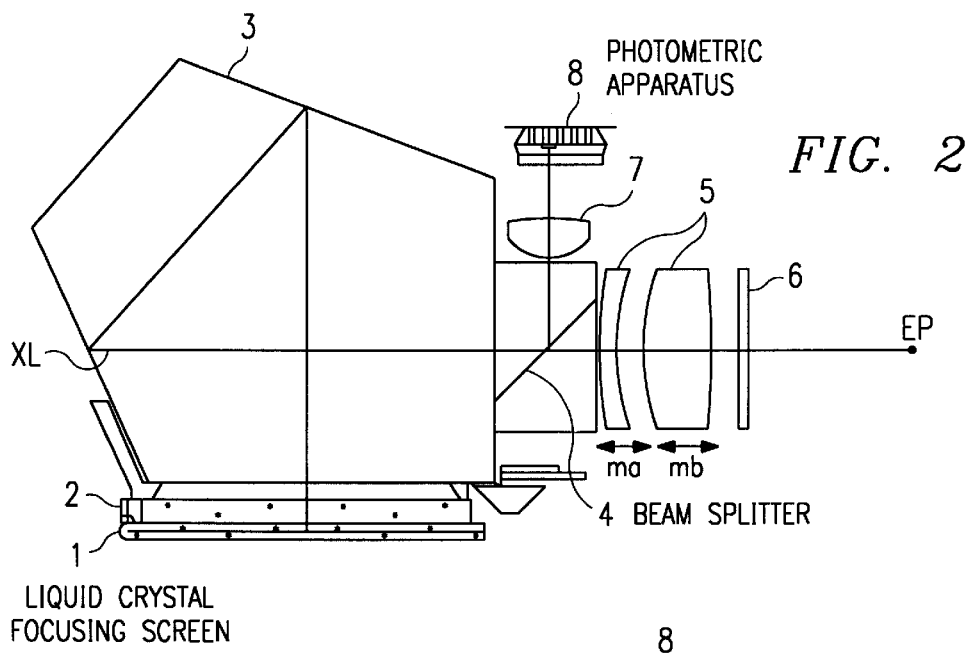
FIG. 2 is a schematic showing the arrangement of a finder optical system used in a first embodiment of the present invention.

FIG. 2 is a schematic which shows a finder optical system used in a first embodiment of the present invention. A liquid crystal focusing screen 1 is a focusing screen provided with a liquid crystal having a variable light diffusion characteristic. An image formed on the liquid crystal focusing screen 1 is viewed by a pupil EP through a Fresnel lens 2, a pentagonal roof prism 3, a beam splitter 4 and a finder eyepiece system including an eyepiece 5 and a protecting glass 6.

A part of finder-axial light XL is reflected upwardly at 90° by the beam splitter 4, provided as a light splitting means in the finder eyepiece system, and the reflected light is directed through a photometric lens 7 to a photometric apparatus 8. The photometric apparatus 8 is constituted by a multi-divisional photometric device consisting of a plurality of devices for performing a multi-divisional photometry with respect to the finder-axial light XL extracted by the reflection by the beam splitter 4.

Figure 1:
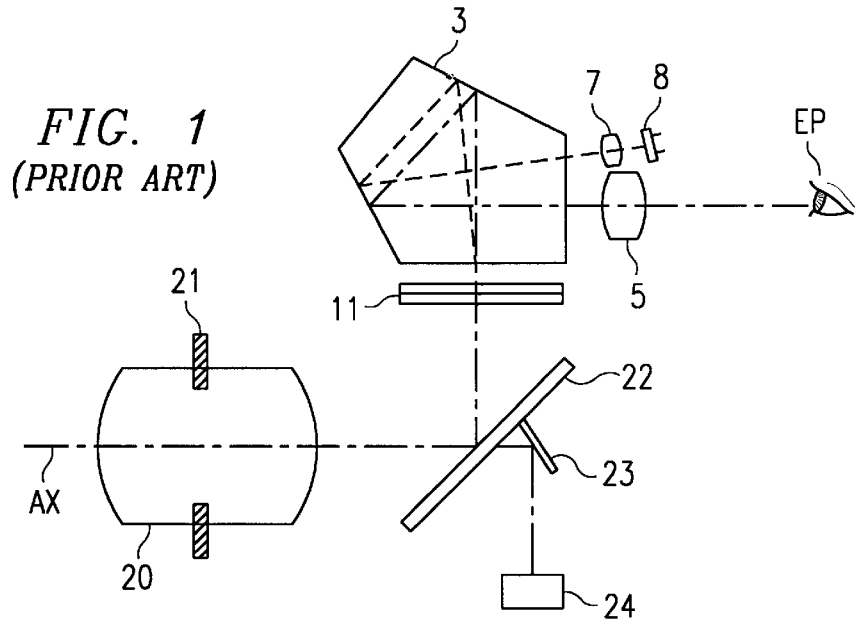
FIG. 1 is a schematic showing the arrangement of a conventional finder optical system.

The light diffusion characteristic of the previously-described focusing screen 11 (FIG. 1) having convex and concave portions on its surface is characterized in that the maximum angle of diffusion (corresponding to θ in the subsequently-described FIG. 11) is limited and that the diffusivity of the focusing screen 11 is low. For this reason, when the image is largely blurred because of a large defocus amount, light of the blur in the vicinity of the maximum angle of diffusion does not reach the eye. In the case where the liquid crystal focusing screen 1 is used as in this embodiment, since the angle of diffusion does not have the above limitation and the angle of diffusion can freely be changed by means of the driving voltage to the liquid crystal, more accurate information on the depth of field is provided. Moreover, with the liquid crystal focusing screen 1, the view through the finder never deteriorates due to the pre-view function, and the way in which the finder image is viewed never changes according to a change of the open aperture value. Further, the brightness of the finder and the accuracy in photometry are maintained high.

Moreover, in this embodiment, since photometry is performed by use of a part of the finder-axial light XL of the finder eyepiece system, the photometric apparatus 8 may be arranged at a position where there is enough space and a compacter camera is realized, compared with than the previously-described camera where the photometric apparatus is arranged at the bottom of the mirror box. As a result, the increase of the camera size is prevented.

Figure 7:
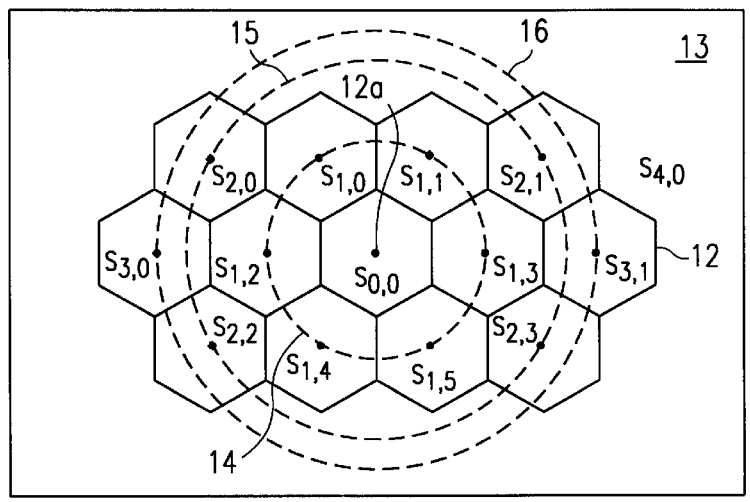
FIG. 7 shows a multi-divisional photometric device pattern of a photometric apparatus employable for the first embodiment of the present invention.

FIG. 7 shows an example of a multi-divisional photometric device pattern of the photometric apparatus 8 used in this embodiment and the concept of a correction condition of an open-aperture photometric error thereof. Thirteen devices 12 for hexagonal spot photometry and one device 13 for peripheral photometry, constituting the photometric apparatus 8, have the multi-divisional photometric device pattern shown in FIG. 7. In the figure, each device is identified by Si,j, where i represents ordinal numbers (0 to 4) of concentric circles whose circumferences include the center of each device, and j represents an ordinal number (0 to 5) of each device within the concentric circles whose circumferences include the center of each device. A point on a multi-divisional photometric device located at the center, which point corresponds to the center of the photographic image plane, is denoted by 12a. A device 12 located at a position corresponding to the center of the photographic image plane is represented by S0,0, and the device 13 (i=4) is represented by S4,0.

One characteristic of this embodiment is that photometric values obtained by the devices 12 (on a first concentric circle 14, devices S1,0–5; on a second concentric circle 15, devices S2,0–3; and on a third concentric circle 16, devices 3.0–1), located on the concentric circles 14 to 16 whose center is the position 12a (the central position of the device S0,0 [hereinafter sometimes referred to as "central device"]) on the multi-divisional photometric device which position corresponds to the center of the photographic image plane, are corrected for every concentric circle by a microcomputer (such as a CPU [central processing unit] 30 in FIG. 20) with the same open-aperture photometric error correction amount. The open-aperture photometric error correction amount for each concentric circle may differ.

For the following reason, the same open-aperture photometric error correction amount is used for the correction of the photometric values of the photometric devices 12 located on the concentric circles 14 to 16.

When tuning is performed with respect to one taking lens (corresponding to 20 in FIG. 1), the tuning value must be corrected every time the taking lens is interchanged. In this case, since it is necessary to store a different correction amount for each device 12 with respect to one taking lens, a huge memory capacity is required for a plurality of taking lenses.

In a system where photometry is performed with respect to the finder-axial light XL as in this embodiment, the light quantity ratios (in other words, light arrival efficiencies) of light beams which actually reach the devices S1,0–5, S2,0–3 and S3,0–1 located at the same distance from the central device S0,0 are the same. For example, the quantities of light reaching the devices 12 and 13 change when the taking lens is interchanged. In this case, if the central device S0,0 is used as a reference, the change of the ratios of the light quantities due to the interchange of the taking lens is similar in the devices 12 located on the predetermined concentric circles 14 (i=1), 15 (i=2) and 16 (i=3). That is, the light arrival efficiencies differ among the devices S1,j (j=0–5), the devices S2,j (j=0–3) and the devices S3,j (j=0–1) located at different distances; and on the same concentric circle, the photometric values are shifted by the same amount in every device 12 (on the first concentric circle, the device S1,0–5; on the second concentric circle, the devices S2,0–3; and on the third concentric circle, the devices S3,0–1).

When the finder-axial light XL is used for photometry as described above, with the central device S0,0 as a reference, the light arrival efficiencies are the same on the concentric circles, and the same fixed correction values may be used for the devices 12 located on the concentric circles (on the first concentric circle, and the device S1,0–5; on the second concentric circle, and the devices S2,0–3; and on the third concentric circle, the devices S3,0–1).

Thus, when the finder-axial light XL is used for photometry, since the six devices S1,0–5 located on the first concentric circle 14, whose center is located at the position 12a of the multi-divisional photometric pattern which position corresponds to the center of the photographic image plane, have the same open-aperture photometric error amount, the same correction value may be provided to all of these six devices. Moreover, since the same is true of the group of four devices S2,0–3 located on the second concentric circle 15 and the group of two devices S3,0–1 located on the third concentric circle 16, the same correction values may be provided for the devices within a group. If the correction is thus made with the same open-aperture photometric error correction amount with respect to the devices 12 located on each concentric circle, since it is unnecessary to store in a memory the open-aperture photometric error correction amounts with respect to all of the devices 12, the correction operation of the photometric error may be simplified. As a result, no huge memory capacity (specifically, capacity of a read only memory, etc.) is necessary even if the light diffusion characteristic of the liquid crystal focusing screen 1 is successively varied.

By moving (in the direction of arrow ma or mb) a convex or concave lens element constituting the eyepiece 5 as shown in FIG. 2, the finder dioptric power is adjusted. By providing a dioptric power adjusting mechanism which moves the eyepiece 5, more accurate information on the depth of field is provided to the greatest number of users irrespective of their eyesight.

Figure 8:
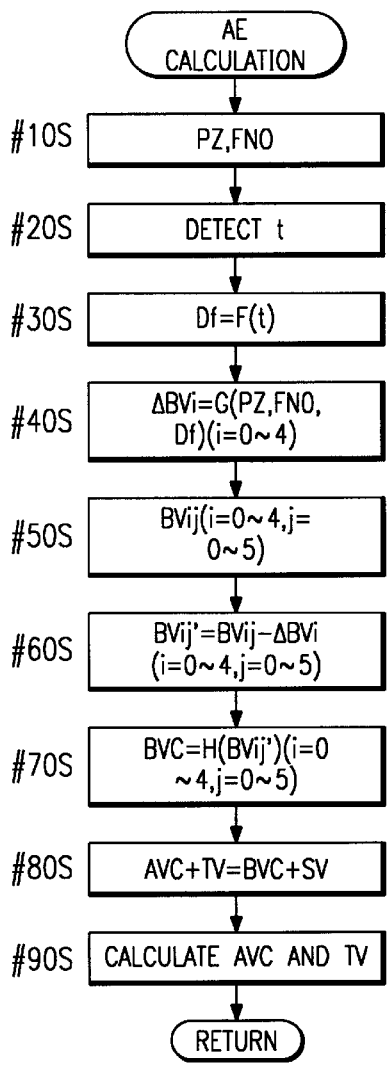
FIG. 8 is a flowchart of an AE calculation routine executed in the first embodiment of the present invention.

Referring now to the flowchart of AE (automatic exposure) calculation routine of FIG. 8, the open-aperture photometric error correction will be described. The AE calculation routine is a routine in which a control luminance value BVC of the camera is calculated based on a luminance value (i.e. photometric value) BVi,j calculated based on output values of the fourteen photometric devices 12 and 13 of the photometric apparatus 8, and a control aperture value AVC and a shutter speed TV are determined.

First, a lens code is read out from the taking lens to obtain information on the length (position) PZ of its exit pupil and its minimum F-number (step #10S). Then, the light transmittance t of the liquid crystal focusing screen 1 is measured (step #20S). The measurement of the light transmittance is performed by use of a diffusion factor detector 50 including a light projector 51 and a light receiver 52 (FIGS. 28 and 32) similarly to a subsequently-described tenth embodiment. By using the obtained transmittance t, a diffusion factor Df of the liquid crystal focusing screen 1 is calculated(F(t)) (step #30S).

Based on the exit pupil position PZ, minimum F-number and diffusion factor Df, an open-aperture photometric error correction amount $\Delta BVi$ (i=0–4), common to all the devices 12 located on an ith concentric circle from the center 12a of the central device S0,0, is determined (G(PZ,FNO,Df)) (step #40S). Then, an output (raw luminance output) BVij from a jth device of the devices located on the ith concentric circle is detected (step #50S). That is, the outputs from all of the devices 12 and 13 are detected independently of one another.

Then, the previously-described correction with the same correction value is performed with respect to the devices located on the ith concentric circle (BVij–$\Delta$BVi(i=0–4, j=0–5)) to obtain an actual luminance BVij' (step #60S). The obtained actual luminance BVij' is weighed with a predetermined value to calculate the control luminance value BVC (=H(BVij')) (step #70S). After a control exposure value (AVC+TV) is obtained based on a value BVC+SV, obtained from the control exposure value BVC, and a value SV obtained from the ISO sensitivity of the film (step #80S), the control aperture value AVC and the shutter speed TV (hereinafter referred to as control TV) are calculated by a predetermined program (step #90S). Then, the process returns.

Figure 3:
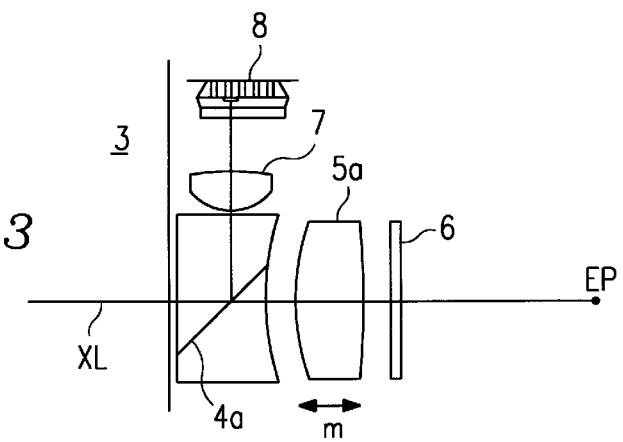
FIG. 3 is a schematic showing the arrangement of a relevant portion of a finder optical system used in a second embodiment of the present invention.

FIG. 3 is a schematic representation which shows a finder optical system used in a second embodiment of the present invention. The arrangement of this embodiment is the same as that of the above-described first embodiment except that the eyepiece side surface of a beam splitter 4a is a lens surface to remove a part of the eyepiece 5.

By using a negative (or positive) lens as the unit of the beam splitter 4a, the distance from the exit surface of the pentagonal roof prism 3 to the protecting glass 6 is short compared to that of the previously-described first embodiment. As a result, the optical properties are improved. For example, an eye point (a distance to a point at which the eclipse occurs due to the pentagonal roof prism 3) increases as shown in FIG. 3, so that the finder magnification may be larger. Similarly to the first embodiment, the finder dioptric power may be adjusted by moving the concave lens element constituting the eyepiece 5a (in the direction of arrow m).

Moreover, the upper surface (photometric lens side exit surface from which a photometry luminous flux exits) of the beam splitter 4a (in the first embodiment, the beam splitter 4 in FIG. 2) may be a lens surface so that the lens function of the photometric lens 7 may partly be omitted. If the surface of the beam splitter 4a from which the photometry luminous flux exits is a lens surface, the condensing of the photometry luminous flux is performed twice: at the lens surface and at the photometric lens 7. As a result, aberrations will decrease and the performance of the spot photometry will increase.

Figure 4:
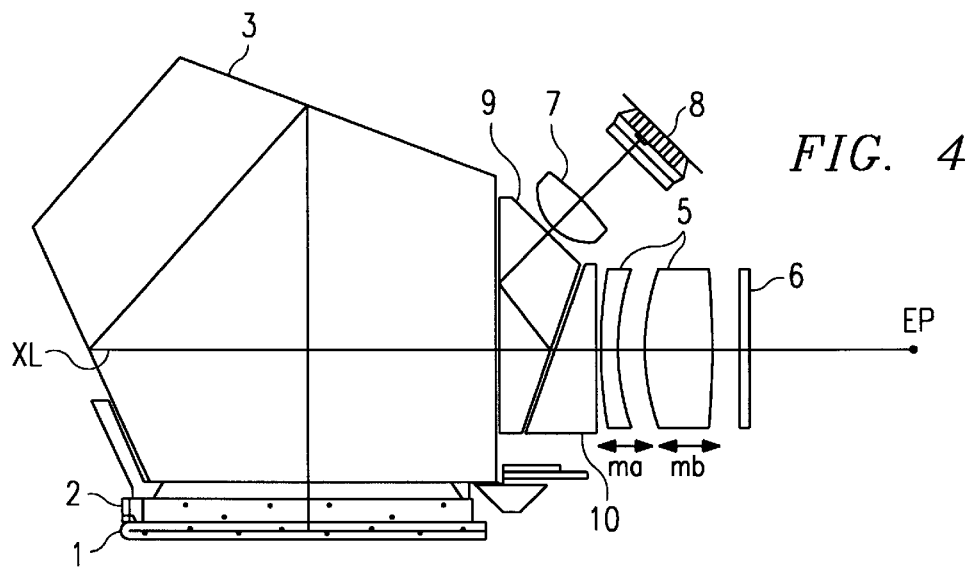
FIG. 4 is a schematic showing the arrangement of a finder optical system used in a third embodiment of the present invention.

FIG. 4 is a schematic representation which shows a finder optical system used in a third embodiment of the present invention. The arrangement of this embodiment is the same as that of the above-described first embodiment except that two wedge-shaped first and second prisms 9 and 10 arranged opposite to each other are used as the beam splitter.

The finder-axial light XL is partly reflected by a second prism side exit surface of the first prism 9 which has appropriately been decentered with respect to the finder optical axis. The whole of the reflected light is reflected by the incident surface of the first prism 9 and directed to the photometric apparatus 8 through the photometric lens 7. Similarly to the first embodiment, the dioptric power of the finder may be adjusted by moving the concave or convex lens constituting the eyepiece 5 (in the direction of arrow ma or mb).

While in this embodiment, the finder-axial light XL is partly reflected at an appropriate angle by applying deposition to the second prism side exit surface of the first prism 9 to provide thereto an appropriate reflectance, the finder-axial light XL may partly be reflected by inserting a half mirror into a gap between the first and second prisms 9 and 10.

Figure 5:
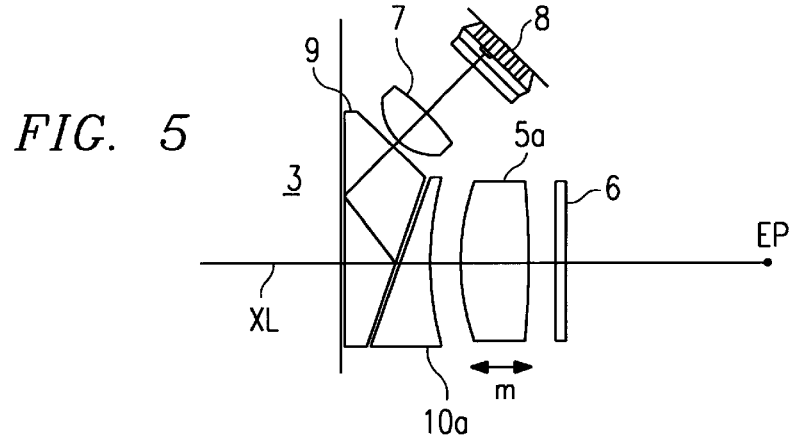
FIG. 5 is a schematic showing the arrangement of a relevant portion of a finder optical system used in a fourth embodiment of the present invention.

FIG. 5 cross-sectionally shows a finder optical system used in a fourth embodiment of the present invention. The arrangement of this embodiment is the same as that of the above-described third embodiment except that the eyepiece side surface of a second prism 10a is a lens surface to remove a part of the eyepiece 5.

While the eyepiece side exit surface of the second prism 10a is a lens surface in this embodiment, the incident surface of the first prism 9, or both of the incident surface of the first prism 9 and the eyepiece side exit surface of the second prism 10a may be lens surfaces. By using as a lens surface the eyepiece side exit surface of the second prism 10a (or as the incident surface of the first prism 9), the optical properties such as the eye point and magnification may be improved.

Figure 6:
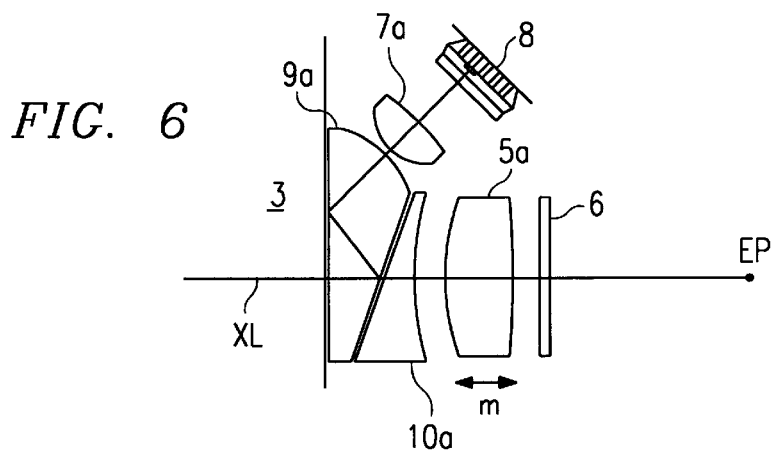
FIG. 6 is a schematic showing the arrangement of a relevant portion of a finder optical system used in a fifth embodiment of the present invention.

FIG. 6 is a schematic representation which shows a finder optical system used in a fifth embodiment of the present invention. The arrangement of this embodiment is the same as that of the above-described fourth embodiment except that the upper portion (photometric lens side exit surface from which a photometry luminous flux exits) of the first prism 9a is a lens surface so that the refractive power of a photometric lens 7a may partly be deleted.

As the surface of the first prism 9a from which the photometry luminous flux exits is a lens surface, the condensing of the photometry luminous flux is performed twice: at the lens surface and at a photometric lens 7a. As a result, aberrations will decrease and the performance of the spot photometry will increase. This advantage is the same as that of the second embodiment where the upper surface of the beam splitter 4a is a lens surface.

Figure 9:
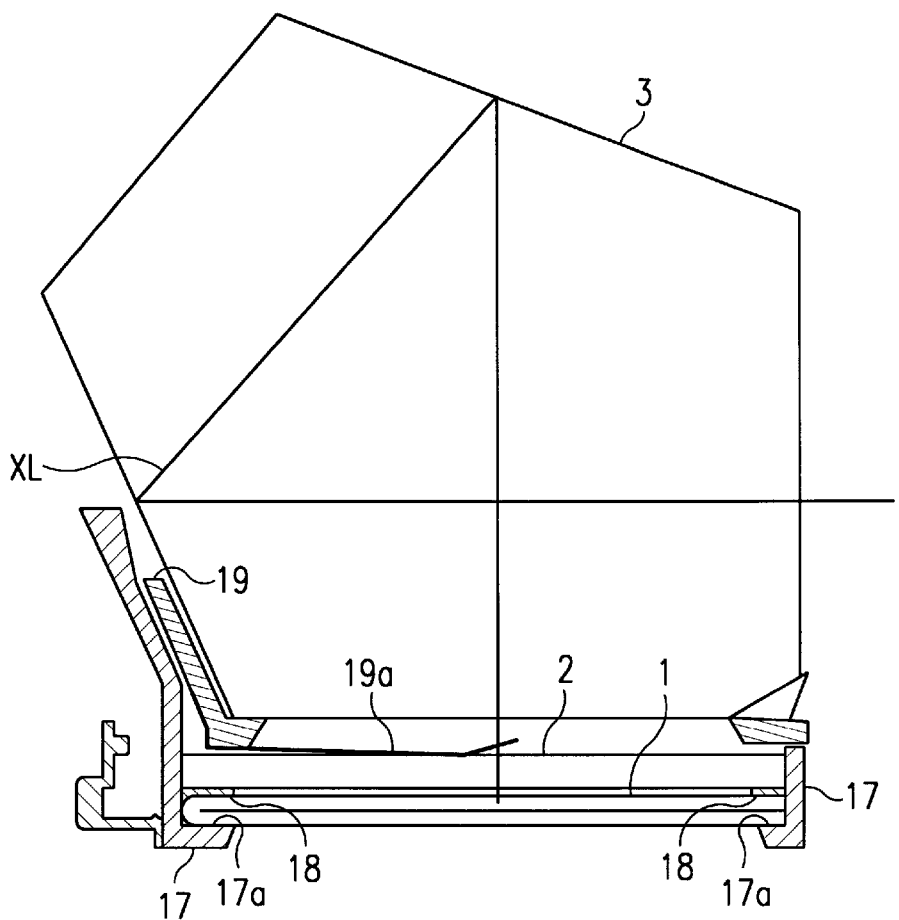
FIG. 9 is a schematic side view, partially in cross section showing the arrangement of a relevant portion of a finder optical system used in a sixth embodiment of the present invention.

FIG. 9 cross-sectionally shows a finder optical system used in a sixth embodiment of the present invention. This embodiment is characterized by a fixing structure of the liquid crystal focusing screen 1, and except for the fixing structure, the arrangement of this embodiment is the same as those of the above-described first to fifth embodiments.

The liquid crystal focusing screen 1 is supported by an abutting surface 17a provided on an upper portion of a mirror box 17, so as to be directly in contact with the abutting surface 17a. On the liquid crystal focusing screen 1, a Fresnel lens 2 made of acrylic (pentagonal roof prism side surface is a Fresnel lens) is arranged with a spacer 18 between. The liquid crystal focusing screen 1 and the Fresnel lens 2 are fixed by being pushed downwardly from the pentagonal roof prism side by a leaf spring 19a attached to a pentagonal roof prism holder 19. With this arrangement, a stable fixing of the liquid crystal focusing screen is realized.

Figure 10:
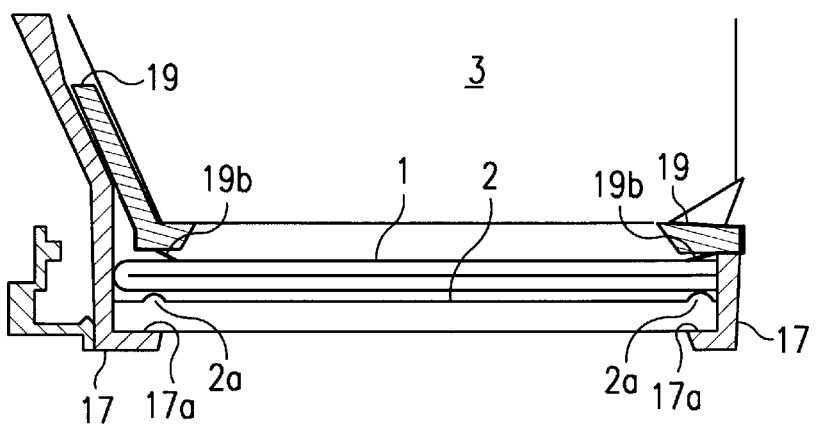
FIG. 10 is a cross-sectional view showing the arrangement of a relevant portion of a finder optical system used in a seventh embodiment of the present invention.

FIG. 10 cross-sectionally shows a finder optical system used in a seventh embodiment of the present invention. The arrangement of this embodiment is the same as that of the above-described sixth embodiment except that the spacer 18 is replaced by a protrusion 2a.

The Fresnel lens 2, made of acrylic and having the Fresnel lens surface and the protrusions 2a, is supported by the abutting surface 17a of the mirror box 17 so as to be directly in contact therewith. The liquid crystal focusing screen 1 is arranged in such manner that the protrusion 2a, provided to protrude from the Fresnel lens 2 toward the pentagonal roof prism 3, is directly in contact with the liquid crystal focusing screen 1. The liquid crystal focusing screen 1 and the Fresnel lens 2 are fixed by being pushed downwardly from the pentagonal roof prism side by a leaf spring 19b attached to the pentagonal roof prism holder 19. With this arrangement, since the liquid crystal focusing screen 1 and the Fresnel lens 2 are pushed downwardly by the leaf spring 19b at a front and a rear of the pentagonal roof prism 3, the stable fixing of the liquid crystal focusing screen 1 and the Fresnel lens 2 is realized.

In the above-described first to seventh embodiments, of the five surfaces of the incident surface of the pentagonal roof prism 3, both side surfaces of Fresnel lens 2 and the both side surfaces of the liquid crystal focusing screen 1, it is preferable to apply low reflectance coating to at least two surfaces including at least one of the surfaces of the liquid crystal focusing screen 1.

Figure 11:
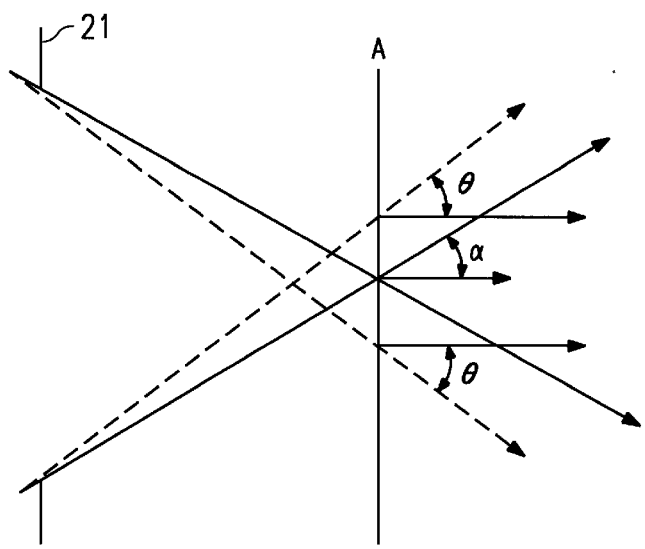
FIG. 11 shows how an image is blurred when a typical focusing screen is used.

Referring now to FIG. 11, how an image formed by the taking lens is blurred will be explained. In the figure, the solid lines represent luminous fluxes under in-focus condition of the lens, while the broken lines represent luminous fluxes under out-of-focus condition of the lens. The luminous fluxes spreading as shown by the broken lines on a focusing image plane A corresponding to the film surface are taken onto the film as blur. If the finder is formed by arranging a diffusing screen (focusing screen) on the focusing image plane A, an in-focus image is not blurred on the diffusing screen but an out-of-focus image is blurred due to the diffusion on the diffusing screen. If the light is nearly horizontally diffused when it is incident at an angle θ, the light which reaches the eye is viewed with a blur amount approximately the same as that on the film surface. As a result, the focus condition is accurately confirmed.

Figure 12:
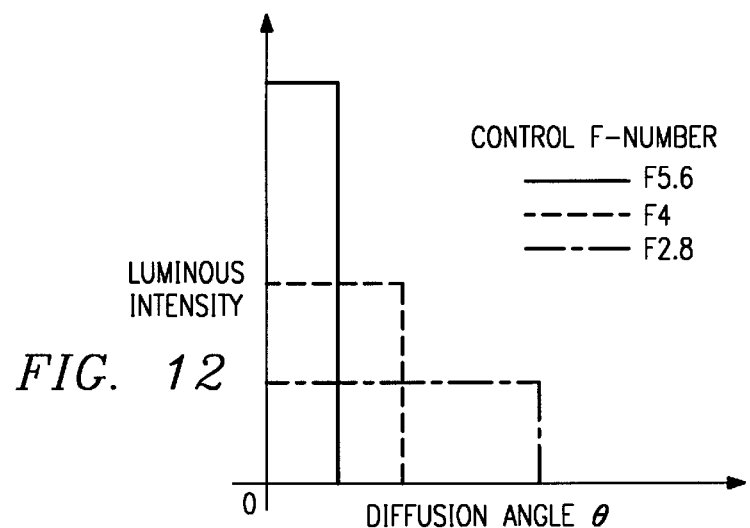
FIG. 12 graphically shows a light diffusion characteristic of an ideal liquid crystal.

Moreover, if the diffusion angle θ is controlled according to the F-number of the taking lens, the blur amount (i.e. depth of field) is confirmed more accurately. That is, since an incident angle a changes so as to fulfill the following equation when the F-number changes:

$$F-\text{number} = \frac{1}{2 \cdot \sin\alpha},$$

if the diffusion angle θ is changed in accordance with the incident angle α as shown in FIG. 12, anyone can confirm the depth of field accurately. In FIG. 12, the solid line, broken line and alternate long and short dash line represent relationships between the diffusion angle and the luminous intensity when the control F-numbers are F5.6, F4 and F2.8, respectively.

In each embodiment of the present invention, the control aperture value indicates an aperture value (e.g. an AE output) for controlling the aperture stop of the taking lens at the time of photographing (at the time of exposure), and the control F-number indicates an F-number at the control aperture value. An aperture stop value indicates an aperture stop value of the diaphragm of the taking lens (corresponding to the aperture 21 of the taking lens 20 in FIG. 1). The F-number at the aperture stop value is indicated by an aperture stop F-number. An open aperture value indicates the value corresponding to the maximum size of the open aperture of the taking lens. The F-number at the open aperture value is indicated by an open aperture F-number. An intermediate aperture value indicates an aperture value in the vicinity of the intermediate value of controllable aperture values (in the lens with an F-number of F1.7, approximately from F4 to F11).

If the aperture stop 21 is brought into a condition which is the same as that at the time of the photographing when the finder is being looked through, the view through the finder will be dark compared to the case where the aperture stop 21 is opened. However, when a liquid crystal having a variable light diffusion characteristic is used as the focusing screen as in the above-described first to seventh embodiments, by changing the light diffusion characteristic of the liquid crystal focusing screen 1 under condition where the aperture is opened, only the blur amount is changed by changing the driving voltage applied to the liquid crystal without the brightness in the finder being changed. As a result, the depth of field is confirmed with the finder view being bright.

That is, by controlling the driving voltage to vary the light diffusion characteristic of the liquid crystal in such manner that the diffusion factor increases as the control F-number at the time of photographing decreases and that the diffusion factor decreases as the control F-number at the time of photographing increases, the depth of field is shown in the finder under condition where the aperture stop is opened (under the same aperture stop condition).

Figure 13:
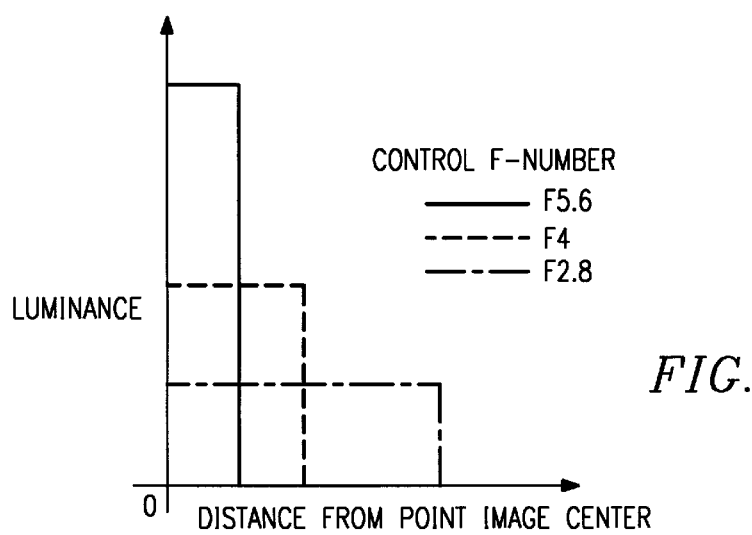
FIG. 13 graphically shows a luminance distribution of a point image when the ideal liquid crystal is used.

In this case, since the luminance distribution of an point image varies according to the control F-number as shown in FIG. 13 at the same defocus amount, a finder image with a blur amount the same as that taken onto the film is viewed. FIG. 13 shows a luminance distribution when a taking lens with an open aperture F-number of F2.8 or less is used. In the figure, the solid line, broken line and alternate long and short dash line represent relationships between a distance from the center of the point image and the luminance when the control F-numbers are F5.6, F4 and F2.8, respectively.

Figure 14:
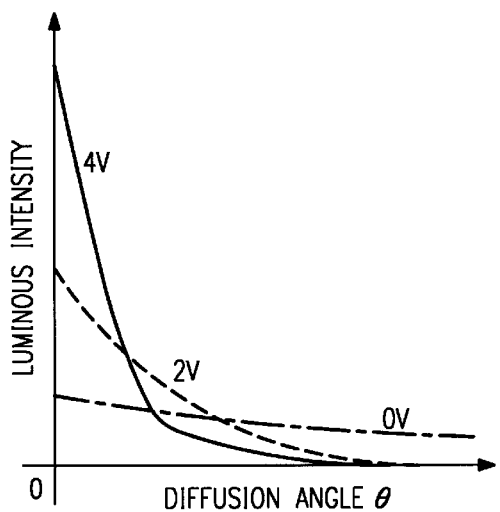
FIG. 14 graphically shows a light diffusion characteristic of an actual liquid crystal.

However, FIGS. 12 and 13 show a light diffusion characteristic of an ideal liquid crystal, and the light diffusion characteristic of actual liquid crystal is as shown by curved lines of FIG. 14, where the solid line, broken line and alternate long and short dash line represent relationships between the diffusion angle θ and the luminous intensity when the driving voltages applied to the liquid crystal are 4 V, 2 V and 0 V, respectively.

Figure 15:
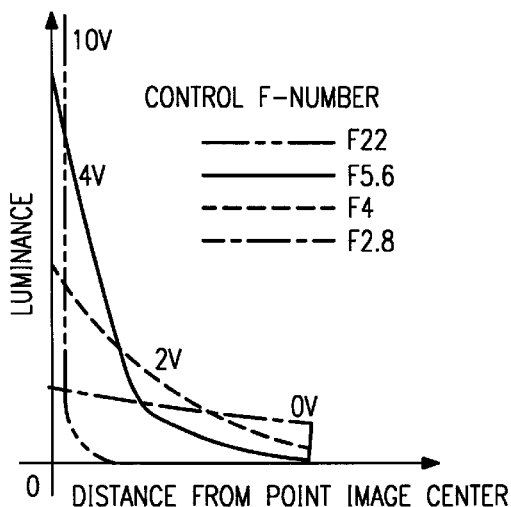
FIG. 15 graphically shows a luminance distribution of a point image when the aperture stop f-number of the taking lens is f/2.8.

In this case, the luminance distribution of the point image is of a curved form as shown in FIG. 15 when the aperture stop F-number of the taking lens is F2.8 at the same defocus amount. When the F-number is F4, the luminance distribution is of a curved form as shown in FIG. 16.

In FIG. 15, the chain double-dashed line, solid line, broken line and alternate long and short dash line represent relationships between the distance from the center of the point image and the luminance when the driving voltages are 10 V, 4 V, 2 V and 0 V with target control F-numbers of F22, F5.6, F4 and F2.8, respectively. The distance from the center of the point image represented by the axis of abscissa is obtained from the diffusion angle θ of the liquid crystal approximately by [Tanθ]×[Defocus amount]. In FIG. 16, the solid line, broken line and alternate long and short dot line represent relationships between the distance from the center of the point image and the luminance when the driving voltages are 4 V, 2 V and 0 V with target F-numbers of F5.6, F4 and F2.8, respectively.

As is understood from FIG. 15, the point image is eclipsed by the aperture stop at the same portion of the diameter as that of the diameter of the blur on the film taken with an aperture stop F-number of F2.8. When the luminance of the point image rapidly varies, since the human eye recognizes the portion of the change as the border of blur, the border of blur is obtained by the eclipse by the aperture stop when the control F-number is the open aperture F-number, and when the aperture is stopped down (for example, when the F-number is F22), the border of blur is obtained by the above-mentioned rapid variation of the luminance since the diffusivity is low. Under the intermediate condition of the aperture stop (e.g. when the F-number is F4), however, since there is no portion where the luminance rapidly varies and the luminance gradually decreases along the radius, the border of blur is not clear. This is recognized as the flare.

Figure 16:
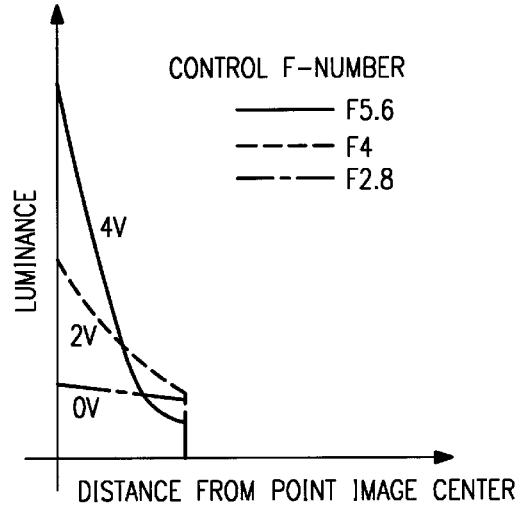
FIG. 16 graphically shows a luminance distribution of a point image when the aperture stop f-number of the taking lens is f/4.

As is understood from FIGS. 15 and 16, even if the driving voltage applied to the liquid crystal is the same, the smaller the aperture stop F-number, the larger the spread of the point picture is, and the resolution and contrast of the defocus portion (blurred portion other than the in-focus portion within the photographic image plane) deteriorates. As a result, the depth of field decreases. This means that when the taking lens is interchanged to one having a different open aperture F-number, even if the control F-numbers are the same, the depth of field confirmed through the finder is changed unless the driving voltage to the liquid crystal is changed. Specifically, if the light diffusion characteristic of the liquid crystal is changed under the condition where the aperture is opened, the depth of field is confirmed with the finder view being bright, whereas if the open aperture F-number is changed due to the interchange of the lens, the depth of field confirmed through the finder is also changed.

To solve this problem, in an eighth embodiment of the present invention, a liquid crystal having a light diffusion characteristic which is variable according to a driving voltage applied thereto is used as the focusing screen (liquid crystal focusing screen 1 used in the above-described embodiments 1 to 7), and in showing the depth of field in accordance with the control aperture value at the time of photographing, the driving voltage to the liquid crystal is corrected by a microcomputer (e.g. the CPU 30 in FIG. 20) so that the diffusion factor increases as the open aperture F-number of the taking lens being used increases. With this arrangement, even if the lens is interchanged, the same depth of field is confirmed through the finder as far as the control F-numbers are the same.

For example, if the control aperture value AVC is F8 and a driving voltage corresponding thereto is V(8) when the open aperture value AVO is F1.4, by setting AVC to AVC=V(8−α1) when AVO is 2 and to AVC=V(8−α1−α2) when AVO=4, the driving voltage is corrected in accordance with the open aperture F-number. Here, α1 and α2 are positive constants determined by the kind of the liquid crystal.

Figure 17:
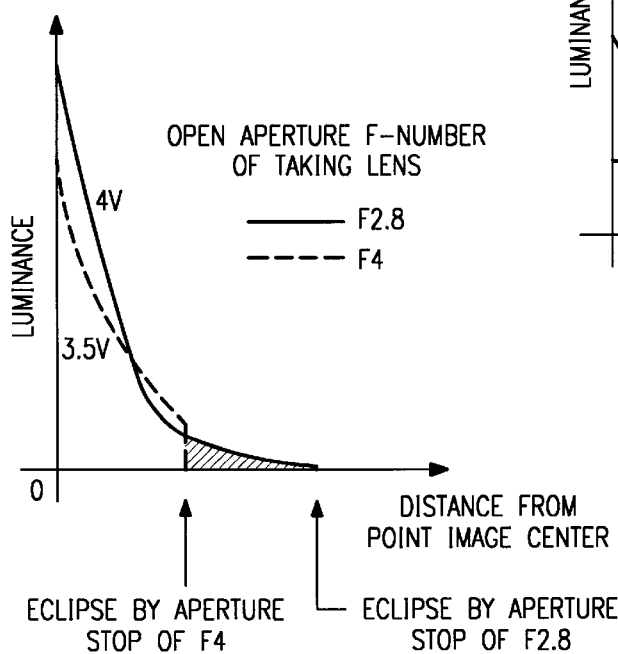
FIG. 17 graphically shows a luminance distribution of a point image when a driving voltage is applied to show the depth of field at a control f-number of f/5.6 in a taking lens having a different open aperture value.

Referring to FIG. 17, the manner in which the driving voltage is corrected in order to realize the luminance distribution of the point picture at the same control F-number when the open aperture F-number is changed due to the interchange of the lens will be described. The figure shows the luminance distribution of the point image when the driving voltage is automatically changed based on information from the taking lens in order to show a depth of field of F5.6 when the open aperture value is changed due to the interchange of the taking lens to a taking lens having a different open aperture value (open aperture values are F2.8 and F4). The solid line and broken line represent relationships between the distance from the point picture and the luminance when the open aperture F-numbers are F2.8 and F4, respectively. The driving voltages of 4 V and 3.5 V are applied thereto, respectively, so that a depth of field with the same control F-number of F5.6 is shown.

As is understood from FIG. 17, when the diffusivities of the liquid crystals are the same, the point image is reduced due to the eclipse by the aperture stop as the open aperture F-number of the aperture stop of the taking lens increases. At this time, the distance from the center of the point image corresponding to the hatched portion in the figure is vanished (that is, the diameter of blur corresponding to the hatched portion decreases), and the contrast of the defocus portion increases. As a result, the depth of field increases. For this reason, correction is made to decrease the depth of field by increasing the diffusion factor by decreasing the driving voltage to 3.5 V.

With the arrangement of this embodiment, even when the taking lens is interchanged, the depth of field is shown more accurately than in conventional cameras. Moreover, the occurrence of the phenomenon that the finder view becomes brighter as the control F-number decreases is reduced.

Figure 18:
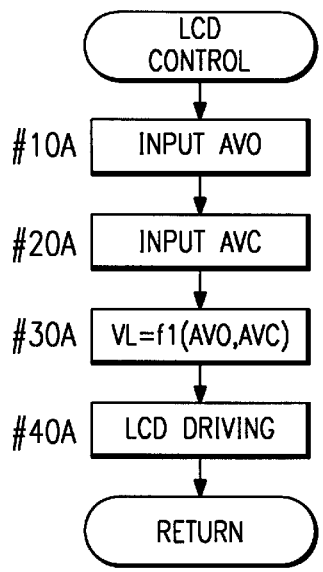
FIG. 18 is a flowchart of an LCD control executed in an eighth embodiment of the present invention.

Referring to the flowchart of FIG. 18, a liquid crystal control operation (hereinafter referred to as LCD control) for performing the above-mentioned correction in the eighth embodiment will be described. First, the open aperture value AVO is inputted (step #10A), and the control aperture value AVC is inputted (step #20A). Then, a liquid crystal driving voltage VL (=f1(AVO,AVC)) is calculated based on the above open aperture value AVO and control aperture value AVC (step #30A), and the liquid crystal is driven based on the calculated voltage VL (this driving will hereinafter be referred to as LC driving) (step #40A). Then, the process returns.

Subsequently, a ninth embodiment of the present invention will be described. This embodiment is characterized in that the resolution and the contrast levels of the defocus portion are corrected to be approximately the same as those of the film surface by setting the open aperture value of the taking lens to an F-number between the control F-number and the open aperture F-number. Specifically, the diffusion factor is corrected in accordance with the open aperture F-number of the taking lens similarly to the eighth embodiment, and to prevent the subsequently-described flare at open aperture, in cases other than the case where the F-number of the control system is in the vicinity of the open aperture F-number, the pre-viewing is performed by setting, depending on the control F-number, the open aperture F-number of the taking lens to an aperture value (an F-number slightly smaller than the control F-number) between the open aperture F-number and the control F-number. With this arrangement, the depth of field is accurately shown even if the control aperture value is changed.

When the aperture of the taking lens is fixed to the open condition and the pre-viewing is performed only by controlling the diffusion factor of the liquid crystal, the diameter of the point image basically coincides with the diameter of the blur caused on the film surface due to the open aperture and is of a circular form depending on the diffusivity as shown in FIG. 15. At this time, the border of blur of the point image is not clear at intermediate aperture, and this is recognized as flare. Moreover, since diffused light with a diffusion angle θ which is larger than an angle eF depending on the aperture stop F-number is never incident on the pupil EP (FIGS. 1 to 6), the finder view becomes darker according to the proportion of such diffused light. That is, since the diffusion factor of the liquid crystal increases as the control F-number increases, the amount of diffused light incident on the pupil EP decreases as the control F-number increases, so that the finder view becomes darker.

It is understood from the luminance distribution of the point image of FIG. 17 that the more the aperture is stopped down (the larger the aperture stop F-number is), the clearer the border of blur of the point picture is, so that less flare is recognized. Moreover, the diameter of the point image decreases due to the eclipse by the aperture stop, and the light quantity decreases with the decrease in the point image diameter. For this reason, in this case, the control of the aperture stop is performed by decreasing the aperture stop F-number to a value smaller than the control F-number so that the generation of flare and the change in brightness decrease according to the light diffusion characteristic of the liquid crystal. In this embodiment, the control is performed, for example, according to the following equation:

$$[\text{Aperture stop F} - \text{number}] = \frac{[\text{Control F} - \text{number}]}{2}$$

This control may be performed until [Aperture stop F-number] equals [Open aperture F-number]. However, it is preferable to set the aperture stop F-number so as to asymptotically approach the open aperture F-number in the vicinity of the open aperture F-number.

According to this embodiment, the occurrence of the phenomenon that the brightness of the finder view is changed according to the control F-number is reduced, and a clearer and more natural finder view is realized. If the aperture is stopped down to an F-number which is larger than the control F-number, the size of the blur is too small because of the eclipse by the aperture stop. That is, if the size of the blur is too small, the contrast of the defocus portion is too high, so that a depth of field larger than a desired depth of field is shown.

Figure 19:
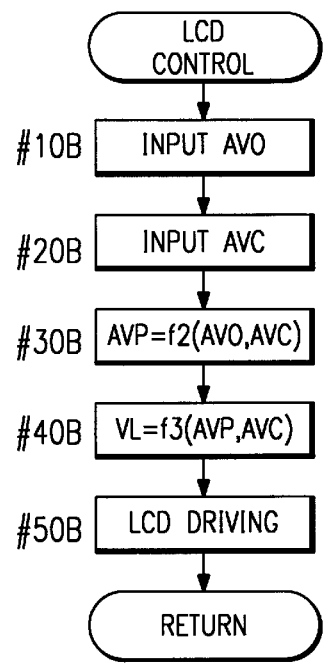
FIG. 19 is a flowchart of an LCD control executed in a ninth embodiment of the present invention.

Referring to the flowchart of FIG. 19, an LCD control for performing the correction in the ninth embodiment will be described. First, the open aperture value AVO is inputted (step #10B), and the control aperture value AVC is inputted (step #20B). Then, an aperture value AVP (=f2(AVO,AVC)) at the time of pre-viewing is calculated based on the above open aperture value AVO and control aperture value AVC (step #30B). The pre-viewing aperture value AVP is an aperture stop F-number obtained by the previously-described [Control F-number]/2. Moreover, since AVP>AVO, by adding the limitation because of the open aperture F-number, the pre-viewing aperture value is determined so as to gradually approach the open aperture value in the vicinity of the open aperture value as described previously. Thereafter, the liquid crystal driving voltage VL (=f3(AVP,AVC)) is calculated based on the pre-viewing aperture value AVP and the control aperture value AVC (step #40B), and the liquid crystal device driving is performed based on the calculated voltage VL (step #50B). Then, the process returns.

Subsequently, a tenth embodiment of the present invention will be described. This embodiment is characterized in that in a camera having in its finder optical system (or photometric optical system) the above-described liquid crystal focusing screen 1 (FIGS. 2, 4, 9 and 10) having a variable light diffusion characteristic, the diffusion factor of the liquid crystal is detected and the driving voltage to the liquid crystal is corrected.

For the detection of the diffusion factor of the liquid crystal, a diffusion factor detector may be used which outputs a received signal (diffusion factor information) as an electrical signal and has a light projecting portion 51 (subsequently-described light projector) and a light receiving portion 52 (subsequently-described light receiver). A light projecting portion 51 projects light on the liquid crystal focusing screen 1. The light receiving portion 52 receives light transmitted or reflected by the liquid crystal focusing screen 1 on which light has been projected. Based on the light received by the light receiving portion 52, the light diffusion characteristic of the liquid crystal is outputted as an electrical signal. Based on the light diffusion characteristic (diffusion factor information) outputted by the electrical signal, the driving voltage of the liquid crystal focusing screen 1 is corrected, for example, by a microcomputer (e.g. the CPU 30 in FIG. 20). A photometric value obtained through a photometry of field light transmitted by the liquid crystal focusing screen 1 is also corrected. By actually detecting the diffusion factor, diffusion factor errors, such as the change of liquid crystal with the elapse of time, caused by the focusing screen itself are eliminated, and the diffusivity of the liquid crystal focusing screen 1 and the photometric value are corrected so that the depth of field and photometry are not affected.

Figure 20:
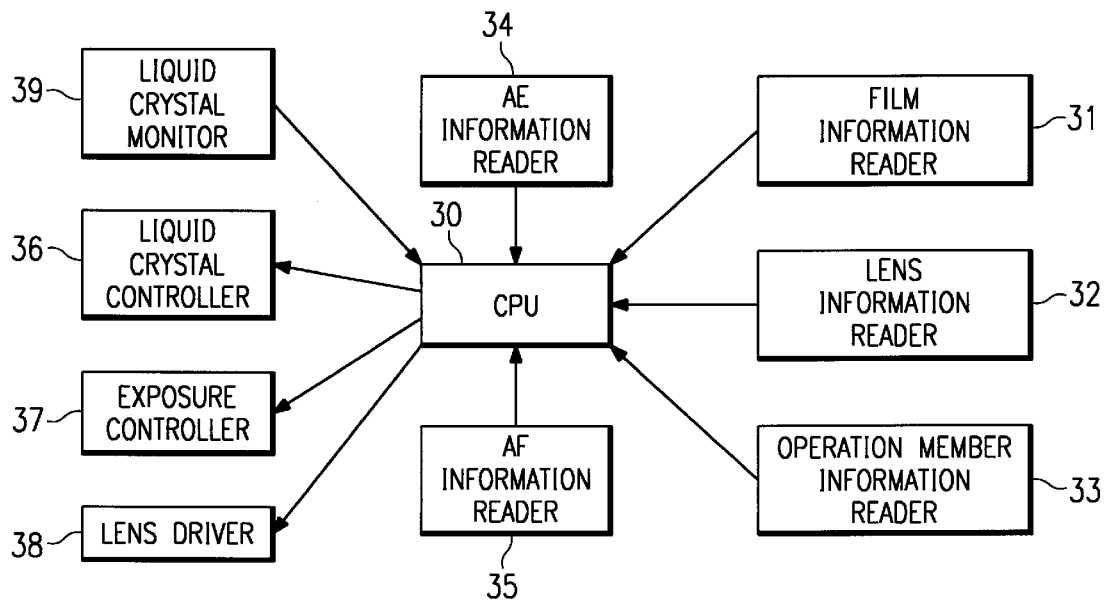
FIG. 20 is a block diagram showing the arrangement of a control system of a tenth embodiment of the present invention.

FIG. 20 is a block diagram showing a control system of the camera embodying the present invention. The camera is controlled by the CPU 30. Film information such as ISO sensitivity is inputted to the CPU 30 by a film information reader 31. Lens information such as the focal length, open aperture value, maximum aperture value and eye point distance (length of the exit pupil of the taking lens) is inputted to the CPU 30 by a lens information reader 32. Luminance information obtained from the photometric apparatus 8 is inputted to the CPU 30 by an AE information reader 34. The defocus amount is inputted to the CPU 30 by an AF (automatic focusing) information reader 35. Operation member information such as information on the exposure mode setting and manual changeover is inputted to the CPU 30 by an operation member information reader 33. Diffusion factor information is inputted to the CPU 30 by a liquid crystal monitor 39 which serves as a diffusion factor detector. According to an instruction executed by the CPU 30 based on these input data, a liquid crystal controller 36 controls the liquid crystal of the focusing screen, an exposure controller 37 controls exposure, a lens driver 38 drives a lens such as the zooming lens and the focusing lens.

Figure 28:
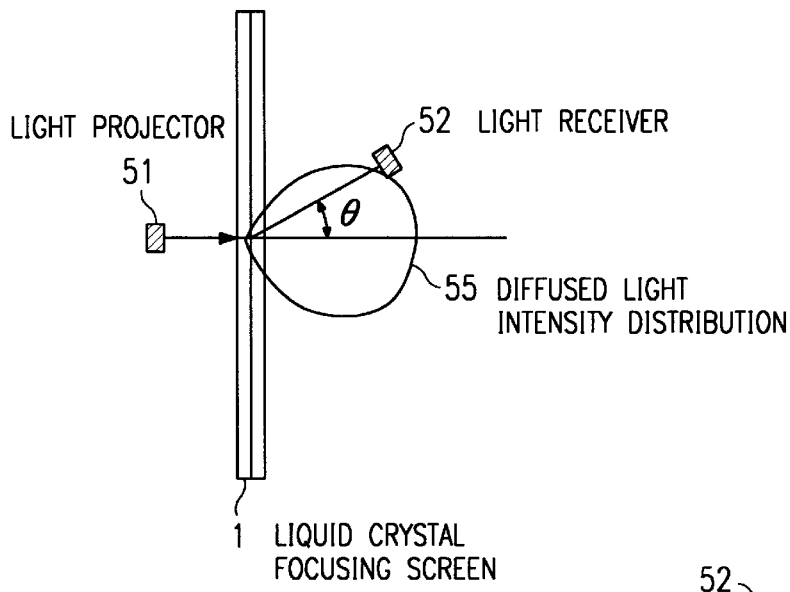
FIG. 28 is a cross-sectional view schematically showing the arrangement of a diffusion factor detector (transmission type) employable for the tenth embodiment of the present invention.
Figure 29:
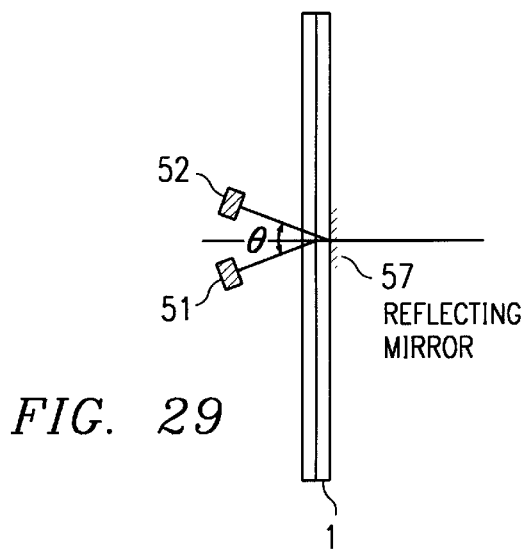
FIG. 29 is a cross-sectional view schematically showing the arrangement of a diffusion factor detector (reflection type) employable for the tenth embodiment of the present invention.

The diffusion factor detector employable in this embodiment will be described. FIG. 28 shows a diffusion factor detector of transmission type, while FIG. 29 shows a diffusion factor detector of reflection type. Both types comprise a light projector 51 and a light receiver 52 which receives and senses light (e.g. infrared rays, visible rays) emitted from the light projector 51. The transmission-type diffusion factor detector detects a transmittance of the liquid crystal focusing screen 1 at a predetermined diffusion angle θ. The reflection-type diffusion factor detector detects the reflectance of the liquid crystal focusing screen 1 at a predetermined diffusion angle θ.

To detect the diffusion factor of the liquid crystal focusing screen 1, it is preferable to detect the quantity (intensities) of diffused light (transmitted light or reflected light) at all the diffusion angles θ (0°<θ<90°) shown in FIGS. 28 and 29. However, when the measurement is performed by projecting light of a constant intensity by the light projector 51, since the relationship between the diffusion angle θ of the liquid crystal focusing screen 1 and the diffusion factor is fixed to some extent as shown at a diffused light intensity distribution 55 of FIG. 28, a typical diffusion factor may be obtained by measuring the quantity of diffused light at a certain diffusion angle θ. Thus, it is unnecessary to measure the intensity of diffused light at all the diffusion angles θ; it suffices just to detect the diffusion factor with respect to a certain or several predetermined diffusion angles θ.

At this time, it is preferable to measure the intensity of diffused light at an optimum diffusion angle θ in order to detect the diffusion factor. The range of the preferable diffusion angle θ is $0° \leq \theta \leq 20°$. The following is the reason therefor. The lower limit is θ=0° since this is the angel at which the sensitivity of the measurement, by the light receiver 52, of the quantity of light not diffused by the liquid crystal focusing screen 1 and passing therethrough is highest. The upper limit is θ=20° since this is the angle which corresponds to an aperture value of approximately F1.4. That is, photographing camera lenses with open aperture values of approximately F1.4 to F8 are available, and to confirm the depth of field, it suffices to confirm the depth of field of up to F1.4. Also, an angle corresponding to approximately F1.4 suffices for the diffusion angle θ of the liquid crystal focusing screen 1. From this, it is understood that the measurement of the intensity of diffused light at diffusion angles θ of θ>20° is unnecessary. Thus, the preferable range of the diffusion angles θ for the detection by the diffusion factor detector (FIGS. 28 and 29) is $0° \leq \theta \leq 20°$ as described above.

Figure 32:
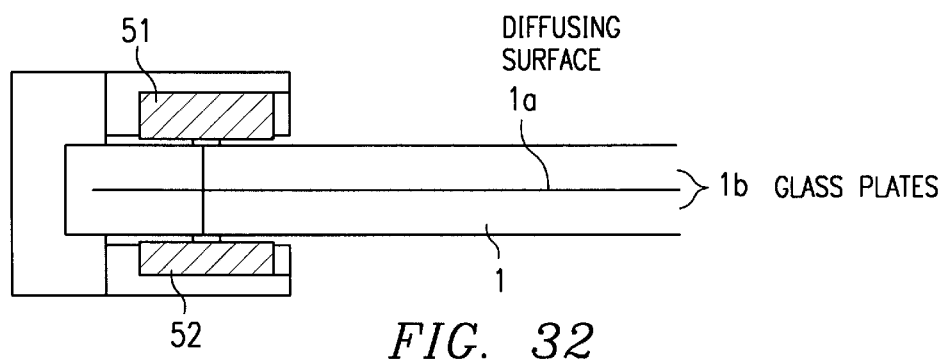
FIG. 32 is a schematic view, partially in cross section showing a diffusion factor detector (transmission type) used in the tenth embodiment of the present invention.
Figure 33:
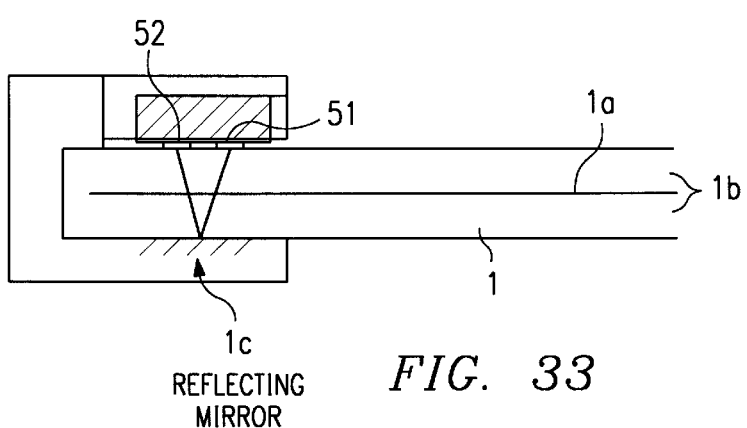
FIG. 33 is a schematic view, partially in cross section showing a diffusion factor detector (reflection type) used in the tenth embodiment of the present invention.

FIG. 32 is a schematic view of the transmission-type diffusion factor detector, while FIG. 33 is a schematic view of the reflection-type diffusion factor detector. The liquid crystal focusing screen 1 comprises, as shown in the figures, two glass plates 1b and liquid crystal constituting a diffusing surface 1a arranged therebetween. In the transmission-type diffusion factor detector of FIG. 32, the light receiver 52 arranged on one side of the liquid crystal focusing screen 1 detects light emitted from the light projector 51 on the other side of the focusing screen 1 and transmitted by the diffusing surface 1a. In the reflection-type diffusion factor detector of FIG. 33, coating is applied, for example, by metalization to a portion on one surface of the glass plate 1b on which light is projected. This forms a reflecting mirror 1c. The light receiver 52 arranged on the other surface of the liquid crystal focusing screen 1 not only detects light reflected by the diffusing surface 1a but also detects light emitted from the light projector 51 (arranged on the same surface as the light receiver 52), transmitted by the diffusing surface 1a, reflected by the reflecting mirror 1c and again transmitted by the diffusing surface 1a. Thereby, allowing detection to be measured with high sensitivity.

Figure 30:
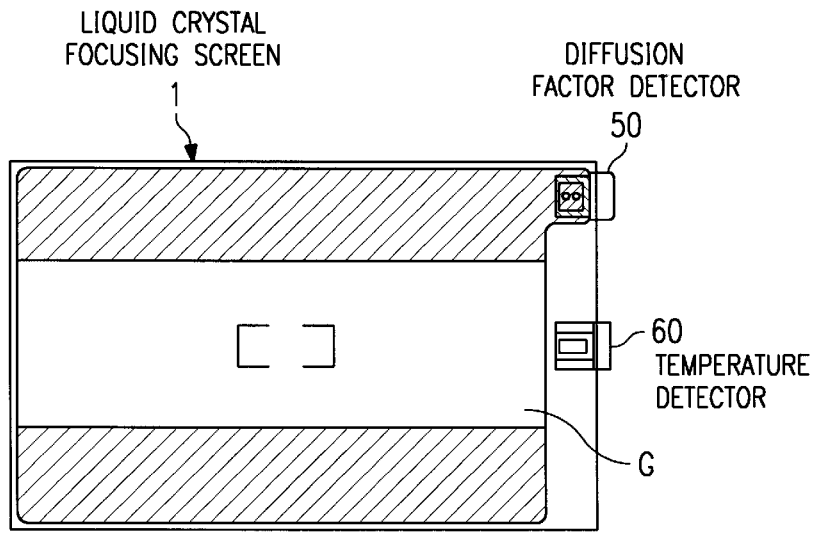
FIG. 30 is a front view of a liquid crystal focusing screen and a diffusion factor detector attached thereto used in the tenth embodiment of the present invention.
Figure 31:
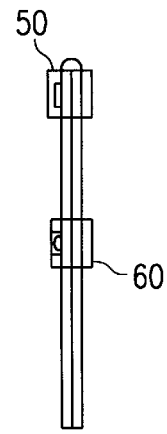
FIG. 31 is an end view showing the liquid crystal focusing screen and the diffusion factor detector attached thereto used in the tenth embodiment of the present invention.

FIGS. 30 and 31 are front view and an end view of the liquid crystal focusing screen 1 to which the diffusion factor detector 50 is attached. A temperature detector 60 is a sensor employed in a subsequently-described eleventh embodiment. While FIGS. 30 and 31 illustrate the liquid crystal focusing screen with both the diffusion factor detector 50 and the temperature detector 60 attached, it is understood that the depth of field may accurately be confirmed with only either one of them being attached.

Moreover, the detectors 50 and 60 are not a hindrance to the confirmation of the depth of field by the user since they are arranged outside a finder field frame G.

Figures 21, 22:
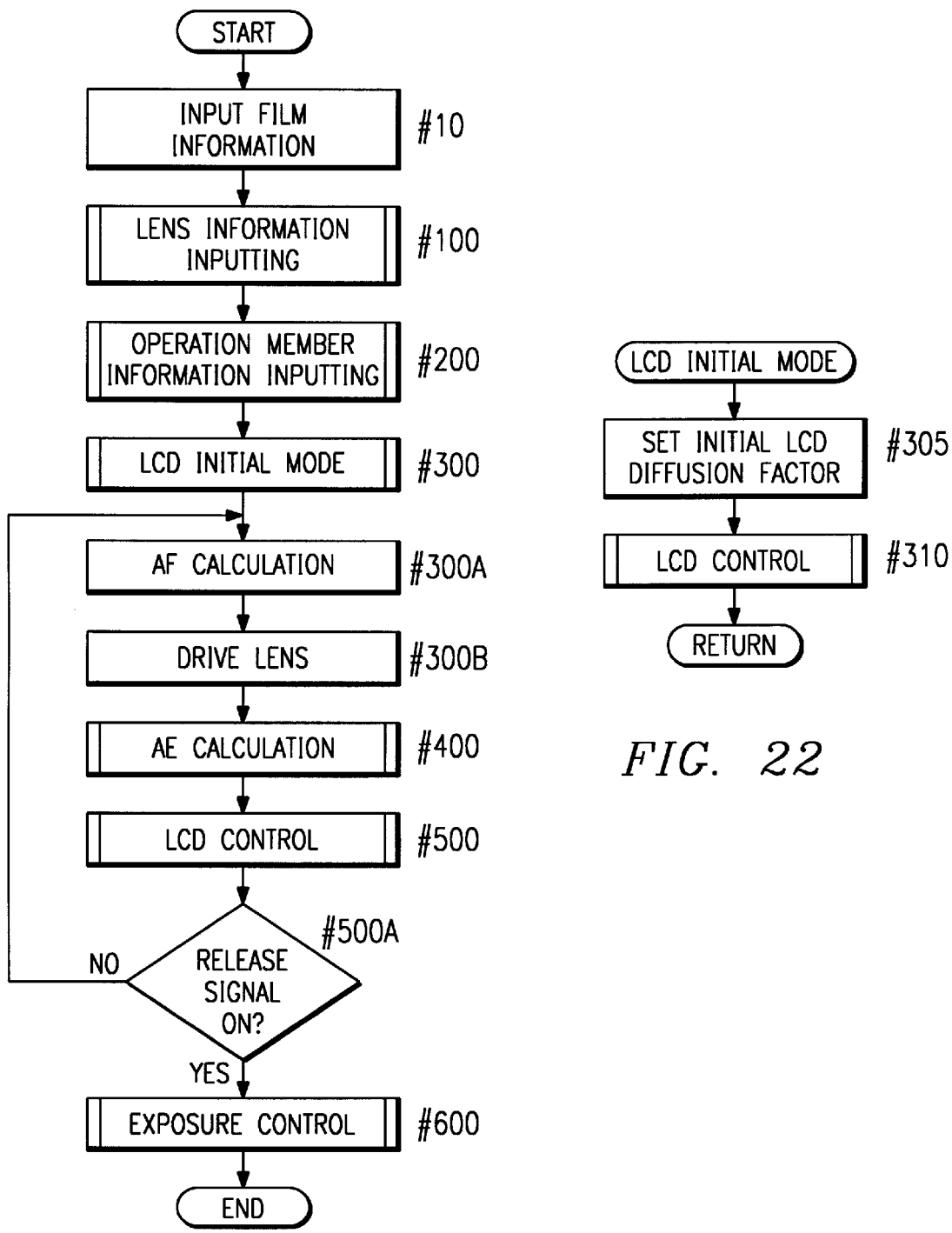
FIG. 21 is a flowchart of a main routine of the tenth embodiment of the present invention.
FIG. 22 is a flowchart of an LCD initial mode subroutine executed in the tenth embodiment of the present invention.

Referring now to the flowcharts of FIGS. 21 to 26, a control operation of this embodiment will be described. The flowchart of FIG. 21 showing the general sequence of the camera is the flowchart of a main routine. When a main switch of the camera is turned on, first, film information such as the film ISO sensitivity is inputted from the film information reader 31 into the CPU 30 (step #10).

Then, at step #100, lens information such as the open aperture value AVO, etc. of the lens is inputted from the lens information reader 32 by executing a subsequently-described lens information inputting subroutine. Then, at step #200, whether the operation member has been operated or not is determined by executing a subsequently-described operation member information inputting subroutine. The result thereof (i.e. operation member information) is inputted from the operation member information reader 33.

Then, at step #300, a subsequently-described LCD initial mode subroutine is executed. The LCD initial mode subroutine is executed to set the initial condition of the liquid crystal focusing screen 1. At step #300A, a lens drive amount is calculated based on the defocus amount inputted from the AF information reader 35 corresponding to a distance measurement apparatus 24 of FIG. 20. At step #300B, focusing is performed by driving the lens based on a result of the calculation through the lens driver 38.

Then, at step #400, AE calculation is performed. Specifically, a luminance value BVi obtained by means of the photometric apparatus 8 is inputted from the AE information reader, and the control aperture value AVC of the camera is calculated under the diffusivity in the initial condition set through the LCD initial mode subroutine. Then, at step #500, an LCD control subroutine (subsequently-described subroutine of FIG. 23) is executed to control the diffusivity of the liquid crystal. Specifically, the diffusion factor of the liquid crystal is controlled through the liquid crystal controller 36 by use of the control aperture value AVC obtained through the AE calculation routine and by correcting the driving voltage based on a result of the diffusion factor detection from the liquid crystal monitor 39.

At step #500A, it is determined whether or not a release signal has been inputted by means of a release button (not shown). When no release signal has been inputted, the process returns to step #300A, and this process is repeated until it is determined that the release signal has been inputted. When the release signal has been inputted, at step #600, well-known exposure control (subsequently-described subroutine of FIG. 26) is performed through the exposure controller 37. Then, the process is completed.

FIG. 44 shows the lens information inputting subroutine executed at step #100 of the main routine of FIG. 21. First, at step #110, the open aperture value AVO is inputted. At step #120, a focal length f is inputted. At step #130, an exit pupil position (length of the exit pupil of the taking lens) PV is inputted. At step #140, a lens code LC is inputted. The value of the lens code is particular to each lens, and from the lens code, it is determined whether or not the lens is a special lens such as the reflecting telephoto lens or a macro lens.

Figure 45:
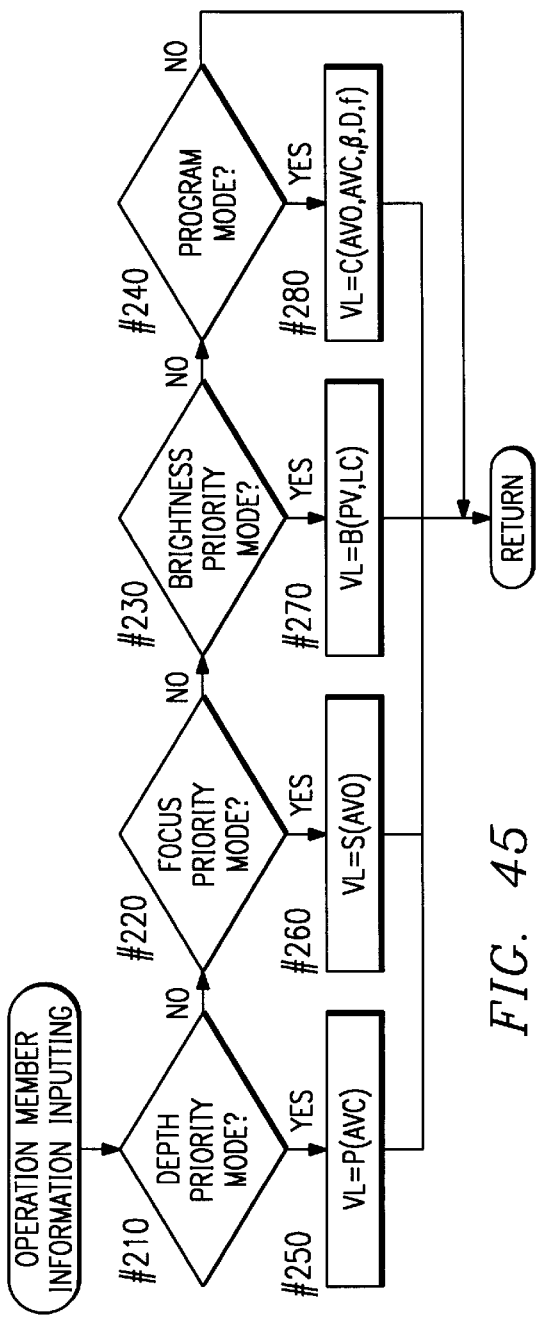
FIG. 45 is a flowchart of an operation member information inputting subroutine executed in the tenth embodiment of the present invention.

FIG. 45 shows the operation member information inputting subroutine executed at step #200 of the main routine of FIG. 21. In this subroutine, a finder mode in the pre-viewing is read out. At steps #210 to #240, the finder mode is selected with the priority order of a depth (of field) priority mode, a focus priority mode, a brightness priority mode and a program mode. The finder mode including the depth priority mode, the focus priority mode, the brightness priority mode and the program mode is selected and set by the user's operation of an operation member such as a dial provided to the camera.

The operation will be described with respect to each mode. At step #210, whether the depth priority mode has been selected or not is determined. When the depth priority mode has not been selected, the process proceeds to step #220. When the depth priority mode has been selected, at step #250, a calculation result P(AVC) based on the control aperture value AVC is set as the driving voltage VL to the liquid crystal. Then, the process returns.

The driving voltage VL for the depth priority mode expressed by VL=P(AVC) as described above is a voltage which is applied to the liquid crystal to provide thereto a light diffusion characteristic corresponding to the depth of field at the control aperture value AVC. Thereby, a blur the same as that of a subject taken on the film is observed in the finder.

Returning to FIG. 45, at step #220, whether the focus priority mode has been selected or not is determined. When the focus priority mode has not been selected, the process proceeds to step #230. When the focus priority mode has been selected, at step #260, a calculation result S(AVO) based on the control aperture value AVC is set as the driving voltage VL to the liquid crystal. Then, the process returns.

The focus priority mode where the driving voltage VL is expressed by VL=S(AVO) as described above is a mode used in a condition where the depth of field is smallest by controlling the light diffusion characteristic of the liquid crystal according to the open aperture value AVO. This mode is used for manual focusing and in-focus determination by the user's eye in AF.

Returning to FIG. 45, at step #230, whether the brightness priority mode has been selected or not is determined. When the brightness priority mode has not been selected, the process proceeds to step #240. When the brightness priority mode has been selected, at step #270, a calculation result B(PV,LC) based on the control aperture value AVC is set as the driving voltage VL to the liquid crystal. Then, the process returns.

Figure 47:
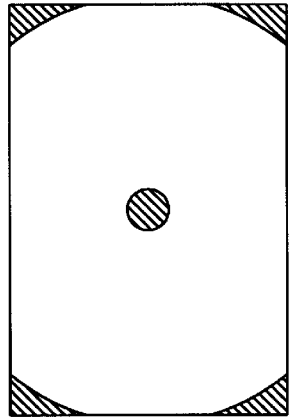
FIG. 47 shows how the finder image is viewed when a reflecting telephoto lens is used as the taking lens in the tenth embodiment of the present invention.
Figure 46:
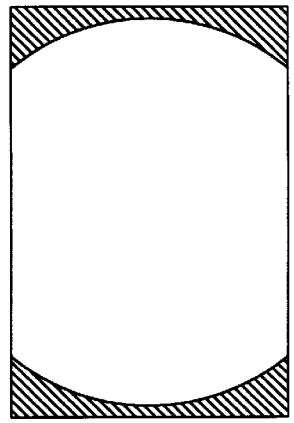
FIG. 46 shows how the finder image is viewed when the exit pupil is long or short in the tenth embodiment of the present invention.

When the liquid crystal has no diffusion factor and light passes therethrough without being diffused, if a lens having a long or short exit pupil or a special lens such as the reflecting telephoto lens is used as the taking lens, the finder is eclipsed by the aperture stop. FIG. 46 shows an eclipsed condition of the finder when a taking lens having a long or short exit pupil is used. FIG. 47 shows an eclipsed condition of the finder when a reflecting telephoto lens is used as the taking lens. As shown in FIG. 47, the shape of the aperture stop of the reflecting telephoto lens is viewed within the finder, and the central portion is also eclipsed.

When the finder is looked through, the pupil of the eye is projected toward the taking lens by the eyepiece and the condenser lens. Since the projection position of the pupil is normally set to a mean position of the projection positions of various taking lenses, when the taking lens used is not a lens whose aperture stop is located at the means position, especially when the taking lens is a lens having a long or short exit pupil or a special lens, the projection position of the pupil is shifted from a set position. Consequently, the pupil is eclipsed, and the periphery of the image plane is eclipsed as shown in FIGS. 46 and 47.

A liquid crystal focusing screen having no diffusivity has a brightness of the same degree as that of a focusing screen of a general finder having no diffusivity. However, as described above, under conditions where light passes through the finder without being diffused, the finder is eclipsed and the shape of the aperture stop is viewed. To solve this problem, in the brightness priority mode, slightly higher diffusivity is provided to taking lenses where eclipse is apt to occur so that the finder is brightest just before the shade starts to be viewed.

Since at what extent of diffusion factor the finder starts to be eclipsed is found from the lens code of the taking lens, the diffusion characteristic in accordance with the taking lens may be set by obtaining exit pupil information from the lens code of the taking lens. That is, when a bright finder is desired in the brightness priority mode, a slight diffusivity, i.e. a diffusivity as low as possible but not zero is provided. The reason why a slight diffusivity is left is that the light is caused to turn in by the diffusivity and the amount of the eclipse is reduced.

Since in a focusing screen having concave and convex portions on its surface, the diffusivity is fixed to be higher than that of the liquid crystal focusing screen 1 of this embodiment, the brightness priority mode cannot be set. In this embodiment, however, since the diffusivity of the liquid crystal focusing screen 1 is set to a value which is the very limit where no eclipse due to the aperture stop is viewed by setting the brightness priority mode, a bright finder with no eclipse (no shade) is realized.

Regarding the driving voltage VL for the brightness priority mode, examples of the function of VL=B(PV,LC) are shown in Table 1. In the table, Vmax represents a maximum driving voltage (voltage at which the liquid crystal has no diffusivity) of the liquid crystal, VP represents a value for correcting the driving voltage VL determined based on the exit pupil length PV of the taking lens, and VR represents a value for correcting the driving voltage VL when a reflecting telephoto lens is used.

As described above, one characteristic of this embodiment is that in a single-lens reflex camera using as the focusing screen a liquid crystal having a variable light diffusion characteristic, different modes can be selected the brightness priority mode in which priority is given to the brightness in the finder, the focus priority mode in which the depth of field in the finder is smallest and the depth priority mode in which priority is given to the showing of the depth of field in the finder which are selectably controlled, for example by the CPU 30 of FIG. 20; when the brightness priority mode is selected, the light diffusion characteristic of the liquid crystal is changed so that the degree of light diffusion is smaller than a predetermined value (for example, so that the light is not diffused). When the focus priority mode is selected, the light diffusion characteristic of the liquid crystal is changed so that the degree of light diffusion is higher than a predetermined value. When the depth priority mode is selected, the light diffusion characteristic of the liquid crystal is changed according to the control aperture value determined by photometric calculation. The user views, as a finder image, light diffused by a degree in accordance with a selected finder mode.

According to this embodiment, selection may be made among the following three basic characteristics: in the brightness priority mode, the subject observation is facilitated since the finder is bright with little shade; in the focus priority mode, focusing is facilitated; and in the depth priority mode, the depth of field is accurately confirmed. Thus, a camera according to this embodiment is easy to operate since it copes with all possible photographing conditions and purposes and the feature of the finder may easily be changed.

Returning to FIG. 45, at step #240, whether the program mode has been selected or not is determined. When the program mode has not been selected, the process returns. When the program mode has been selected, at step #280, a calculation result C(AVO,AVC, β,D,f) based on the control aperture value AVC is set as the driving voltage VL to the liquid crystal. Then, the process returns. Here, β represents a magnification, D represents a subject distance, and f represents a focal length.

One characteristic of the program mode of this embodiment is that subject information or photographing condition is discriminated by use of the open aperture value AVO, control aperture value AVC, magnification β, subject distance D and focal length f, and an optimum finder configuration is provided by setting the diffusion factor of the liquid crystal by the driving voltage VL expressed by VL=C(AVO, AVC,β,D,f).

For example, by presetting predetermined set values f1, β1 and D1 with respect to the focal length f, magnification β and subject distance D in the program mode, the photographing conditions are discriminated from f, β and D for each of wide-angle-type taking lenses and telephoto-type taking lenses. When f is smaller than f1, it is determined that a picture of scenery is taken, whereas when f is larger than f1, it is determined that a picture of a person or a portrait is taken. When β is larger than β1, it is determined that close-up picture is taken, whereas when β is smaller than β1, it is determined that a picture of scenery is taken. When D is larger than D1, it is determined that a picture of scenery is taken, whereas when D is smaller than D1, it is determined that a close-up picture or a picture of a person is taken. The determination based on f, β and D is made by using either of them in a predetermined priority order. With this arrangement, since the photographing condition is automatically discriminated with no need for the user to perform operation every time photographing is performed, optimum finder information is always obtained.

As a result of the above determination, when a picture of scenery is taken, the setting is made such that priority is given to the picture composition and that the finder is bright (that is, the diffusivity is decreased). When a picture of a person or a portrait is taken, to satisfy both the brightness and focusing, the light diffusion characteristic is set to a middle degree where priority is given to both focus and brightness. In the case of the close-up picture, priority is given to the depth of field and control is performed in accordance with an F-number controlling an area which can be taken so that the area is accurately expressed. In the case of the close-up photographing where photographing is normally performed with a stopped-down aperture, the depth of field is actually small since the magnification of the subject is high. For this reason, priority is given to accurately showing the area with respect to which focusing is to be performed.

Moreover, in the program mode, the determination of the photographing condition may be performed in a photographing condition setting mode of the camera. Specifically, when information inputted from the operation member information reader 33 includes the photographing condition setting mode, a light diffusion characteristic in accordance with the mode may be provided to the liquid crystal. The photographing condition setting mode of the camera is a mode, such as a portrait photographing mode, provided on the supposition of a specific photographing scene. The mode for a specific photographing scene is set in accordance with a data inputted by a key operation or an IC (integrated circuit) card prepared for the specific photographing scene. In the mode for a specific photographing scene, since the photographing condition is automatically discriminated, optimum finder information is always obtained.

A sport mode, a close mode, a portrait mode and a scenery mode are examples of the mode for a specific photographing scene. According to each mode, an optimum combination of the aperture value and shutter speed is determined. When these modes are selected, the program mode works with a light diffusion characteristic in accordance with each mode. For example, in the sport and scenery modes, the diffusivity is set to be rather low, whereas in the portrait and close modes, it is set to be rather high.

Referring now to FIG. 22, there is shown the flowchart of the LCD initial mode subroutine executed at step #300 of the main routine of FIG. 21. At step #305, the diffusion factor of the liquid crystal is set to a predetermined initial value. An initial value in accordance with the finder mode (the above-described depth priority mode, etc.) in pre-view read out in the operation member information inputting routine of FIG. 45 is set. At step #310, the initial value is set as the target value of the diffusion factor of the liquid crystal. After the LCD control (subsequently-described subroutine of FIG. 23) is performed until the diffusion factor is obtained, the process returns.

Figure 23:
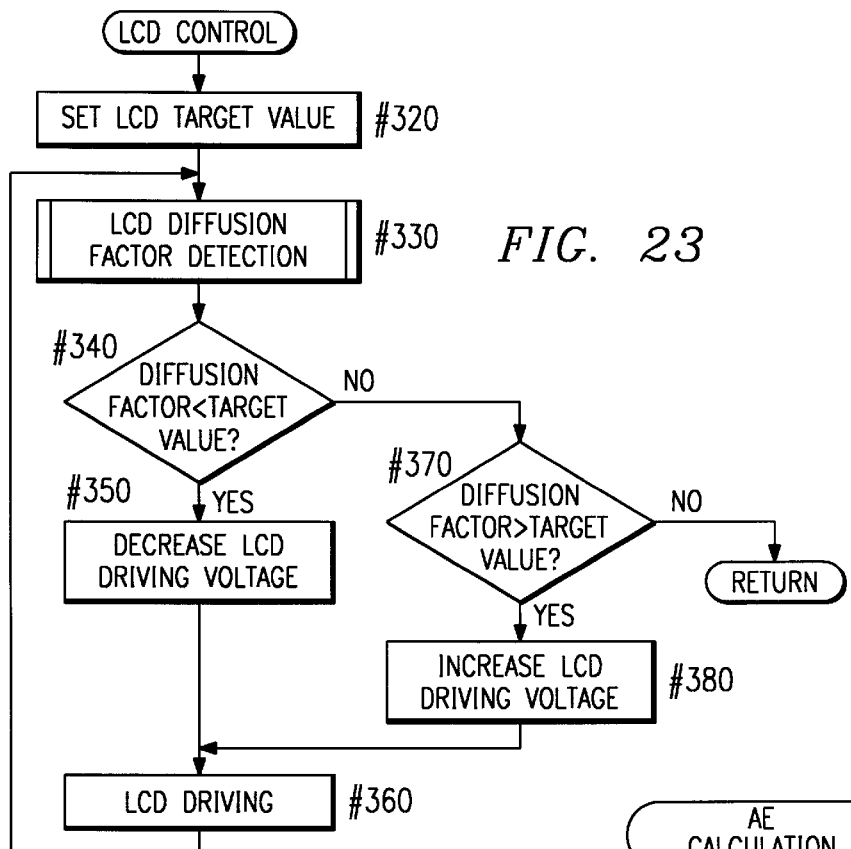
FIG. 23 is a flowchart of an LCD control subroutine (diffusion factor detection type) executed in the tenth embodiment of the present invention.

Referring to FIG. 23, there is shown the flowchart of an LCD control (diffusion factor detecting type) corresponding to the LCD control performed at step #500 of the main routine of FIG. 21 and the LCD control performed at step #310 of the LCD initial mode subroutine of FIG. 22.

First, at step #320, a target diffusion factor with which the liquid crystal is to be controlled (hereinafter referred to as "LCD target diffusion factor" or "target value") is set. In the LCD control performed at step #500 of the main routine of FIG. 21, the LCD target diffusion factor is a diffusion factor in accordance with the control aperture value AVC obtained by the AE calculation performed at step #400 of FIG. 21, in other words, a driving voltage obtained before the correction based on a result of the diffusion factor detection. In the LCD initial mode subroutine executed at step #310 of FIG. 22, the LCD target diffusion factor is a diffusion factor provided as an initial value, in other words, a driving voltage under the initial state of the liquid crystal.

Then, at step #330, a subsequently-described LCD diffusion factor detection subroutine is executed. At step #340, whether the diffusion factor of the liquid crystal is lower than the LCD target diffusion factor or not is determined. When the diffusion factor is lower than the target value, in accordance with the extent of the lowness, the driving voltage VL of the liquid crystal is decreased (step #380). Then, the liquid crystal is driven (step #360) and the process return to step #330.

When the diffusion factor is equal to or higher than the target value, whether the diffusion factor is higher than the target value or not is determined at step #370. When the diffusion factor is higher than the target value, in accordance with the extent of the highness, the driving voltage VL of the liquid crystal is increased (step #380). Then, the liquid crystal is driven (step #360) and the process returns to step #330. When the diffusion factor is equal to or lower than the target value, determining that the diffusion factor of the liquid crystal has become equal to the target value within a predetermined error range, the process returns to the main routine while maintaining the driving voltage obtained at that time.

Figure 24:
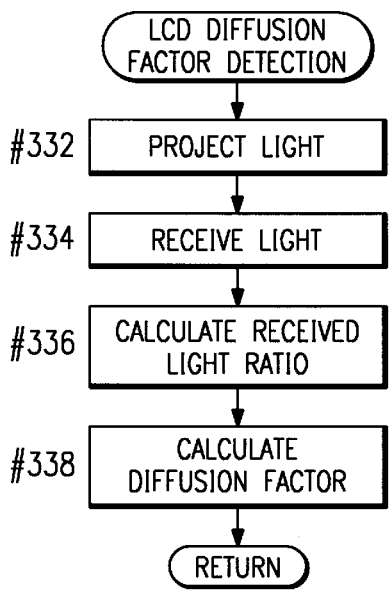
FIG. 24 is a flowchart of an LCD diffusion factor detection subroutine executed in the tenth embodiment of the present invention.

Referring now to FIG. 24, there is shown the LCD diffusion factor detection subroutine executed at step #330 of FIG. 23 and at step #420 of subsequently-described FIG. 25. First, from the light projector 51 of the diffusion factor detector arranged as shown in previously-described FIGS. 28 and 32 or FIGS. 29 and 33 in such manner that the transmittance or the reflectance of the liquid crystal is measured, an infrared ray for measurement (or a visible ray may be used) is projected toward the diffusing surface 1a (step #332).

The projected light is diffused by the diffusing surface 1a in accordance with the diffusion factor thereof. By receiving a part of the projected light (or light transmitted/reflected without being diffused) by the light receiver 52 at that time, an electrical output in accordance with the light quantity is obtained from the light receiver 52. After the received light ratio calculation is performed (step #336), the diffusion factor is calculated (step #338), and the process returns. To monitor the diffusion factor, as previously-described, it is not unnecessary to measure the diffusion factor with respect to all the diffusion angles; the transmitted light quantity or the reflected light quantity of zero-order light (not diffused light with a diffusion angle θ of 0°) is measured, or a transmitted light quantity or a reflected light quantity at a pre-measured angle is measured.

Figure 25:
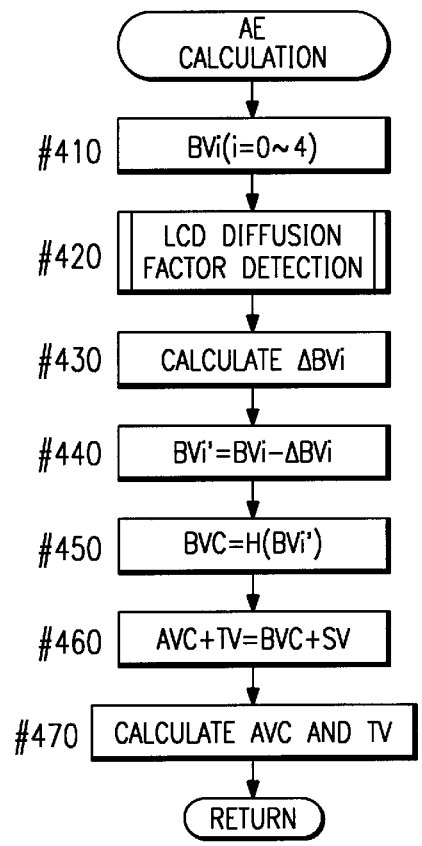
FIG. 25 is a flowchart of an AE calculation subroutine (diffusion factor detection type) executed in the tenth embodiment of the present invention.
Figure 34:
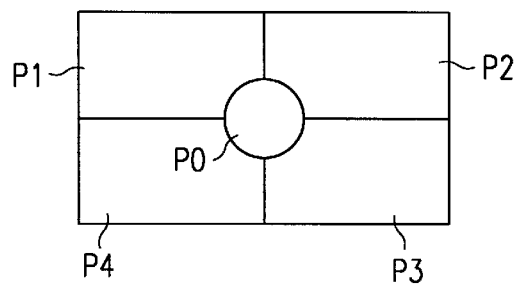
FIG. 34 shows a five-divisional photometric device pattern of a photometric apparatus used in the tenth embodiment of the present invention.

Referring to FIG. 25, there is shown the subroutine of the AE calculation performed at step #400 of the main routine of FIG. 21. The photometric apparatus used in this embodiment is constituted by five-divisional photometric device, and constitutes not the previously-described 14-divisional photometric pattern (FIG. 7) but a five-divisional photometric device as shown in FIG. 34. The AE calculation routine is a routine for determining the control aperture value AVC and shutter speed TV by the calculation of the control luminance value BVC of the camera based on luminance values BV0 to BV4 calculated from output values of five photometric devices P0 to P4 shown in FIG. 34.

First, the luminance value BVi is inputted from a photometric apparatus (corresponding to the photometric apparatus 8 of FIGS. 2 to 6) for performing photometry based on light from a subject (step #410). Then, the previously-described LCD diffusion factor detection (FIG. 24) is performed (step #420). Based on the detected diffusion factor information and lens information (open aperture F-number, exit pupil position), a photometric error correction amount ΔBVi (i=0 to 4) corresponding to each of the devices P0 to P4 is calculated (step #430).

The correction of the luminance value BVi is made based on the open aperture value AVO of the taking lens and the driving voltage VL of the liquid crystal. The correction amount ΔBVi differs among the devices P0 to P4. The reason why the correction value ΔBVi is determined with the driving voltage VL as the parameter is that the quantity of light incident on each of the photometric devices P0 to P4 differs according to the diffusivity depending on the driving voltage VL.

The correction value ΔBVi is obtained by the following expression:

$$\Delta BVi = ei \cdot AVO + fi \cdot VL$$

where i=0 to 4, and ei and fi are constants.

If the value of the driving voltage VL further increases (diffusivity decreases), it is also necessary to vary the correction value according to the exit pupil length of the taking lens. In such a case, the correction value ΔBVi obtained by the following expression is used:

$$\Delta BVi = ei \cdot AVO + gi(PV, VL)$$

where PV is the exit pupil length of the taking lens, i=0 to 4, and ei is a constant. gi will be explained later.

A luminance value BVi' after the correction is obtained by correcting each of the five correction values BV0 to BV4 based on the luminance correction value ΔBVi and the device output luminance value BVi (step #440). BVi' is used in the AE calculation thereafter.

The after-correction luminance value BVi' (i=0 to 4) is weighed by a predetermined value to obtain the control luminance value BVC(=H(BVi')) (step #450). After the control exposure value (AVC+TV) is obtained based on BVC+SV obtained from the control luminance value BVC obtained at step #450 and the value SV obtained from the ISO sensitivity (step #460), the control aperture value AVC and the control TV are calculated by a predetermined program (step #470). Then, the process returns.

This program depends on a photographing scene determined by automatic detection or manual setting, and an aperture value and a shutter speed which are in accordance with the photographing scene are determined. In the case of portrait photographing, the shutter speed is determined with the aperture being opened, while in the case of the scenery mode and the close mode, the shutter speed is determined with the aperture being stopped down. Regarding this, no further description will be given since this is well known in the art.

Subsequently, the above-mentioned function gi(PV,VL) will be explained which is used to calculate the correction value ΔBVi when the diffusivity is low. In the case where photometry is performed by using the finder-axial light XL like the previously-described first embodiment (FIG. 2, etc.), it is unnecessary to use the function gi(PV,VL) to calculate the correction value ΔBVi. However, in the case where the photometric devices are arranged at a predetermined angle with respect to the optical axis (for example, in the manner in which the photometric apparatus 8 is arranged in FIG. 1), if the diffusivity of the liquid crystal is low, it is necessary to perform the above-described correction based on the correction value ΔBVi which is calculated by use of the function gi(PV,VL) obtained as follows.

For example, in the case of i=0, the function gi(PV,VL) is gi(PV,VL)=0; in the case of i=1 or 2, gi(PV,VL) takes the value shown in Table 2; and in the case of i=3,4, gi(PV, VL) takes the value shown in Table 3.

When i=0, the device P0 is not readily affected by the exit pupil and the light diffusion characteristic since it is located in the center as shown in FIG. 34. Therefore, no harm is done if the term gi(PV,VL) is 0 in the luminance value correction.

When i=1 or i=2, since the devices P1 and P2 are arranged as if they stared in the upper direction of the image plane, overexposure occurs when the exit pupil of the lens is short, and the lower the diffusivity is, the larger the change amount is. For this reason, as shown in Table 2, gi(PV, VL) takes a positive value when the exit pupil is short and the driving voltage VL is high. It takes negative values in other cases.

When i=3 or i=4, since the devices P3 and P4 are arranged as if they stared in the lower direction of the image plane, overexposure occurs when the exit pupil of the lens is long, and likewise, the lower the diffusivity is, the larger the change amount is. For this reason, as shown in Table 3, gi(PV,VL) takes a positive value when the exit pupil PV is long and the driving voltage VL is large. It takes negative values in other cases.

Figure 26:
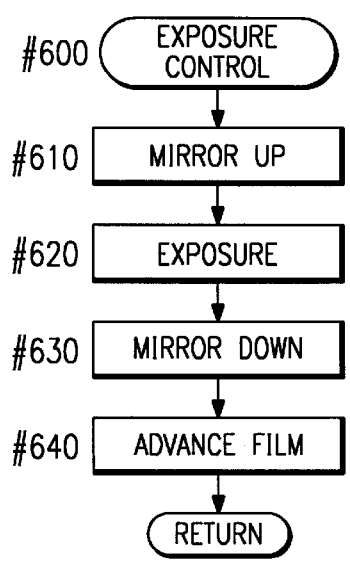
FIG. 26 is a flowchart of an exposure control subroutine executed in the tenth embodiment of the present invention.

Referring to FIG. 26, there is shown the exposure control subroutine executed at step #600 of the main routine of FIG. 21. In this exposure control subroutine, after a quick return mirror (corresponding to the main mirror 22 of FIG. 1) is moved up (step #610), in accordance with the control TV and the control aperture value AVC determined by the above-described AE calculation routine of FIG. 25, the shutter curtain and the aperture stop of the taking lens are controlled to perform exposure (step #620). After the exposure, the quick-return mirror is moved down (step #630) and the film is advanced (step #640). Then, the process returns.

Subsequently, an eleventh embodiment of the present invention will be described. This embodiment is characterized in that in a camera having in its finder optical system (or in photometric optical system) of the above-described liquid crystal focusing screen 1 (FIGS. 2, 4, 9 and 10) having a variable light diffusion characteristic, the temperature of the liquid crystal is detected and the driving voltage VL is corrected in accordance with the detected temperature. Moreover, the photometric value obtained by the photometry of field light transmitted by the liquid crystal focusing screen 1 is also corrected.

To detect the temperature of the liquid crystal, the surface temperature of the liquid crystal focusing screen 1 is taken by the temperature detector 60 attached to a position on the liquid crystal focusing screen 1 outside the finder field as shown in FIGS. 30 and 31. The temperature detector 60 outputs the detected temperature information as an electrical signal, and corresponds to the previously-described liquid crystal monitor 39 of FIG. 20.

The liquid crystal focusing screen 1 presents characteristics particular to liquid crystal since the diffusion surface 1a is made of liquid crystal. Above all, the change of characteristics in response to a change of temperature is large. Even when the same driving voltage is applied, the diffusion factor increases as the temperature decreases. Therefore, in order to obtain a desired diffusion factor by controlling the driving voltage VL, it is necessary to control or detect the temperature of the liquid crystal. For this reason, in this embodiment, the temperature detector 60 is arranged in the vicinity of the liquid crystal 1 to detect the temperature of the liquid crystal.

According to this embodiment, since the temperature of the liquid crystal is actually detected by the temperature detector 60 and the diffusivity of the liquid crystal is controlled to be appropriate by correcting the driving voltage of the liquid crystal focusing screen 1 by, for example, the above-mentioned CPU 30 based on the detection result, an accurate, highly-responsive diffusion factor which will never be affected by errors caused by environmental changes of the liquid crystal is provided for the liquid crystal. Therefore, like the above-described case where the diffusion factor detector 50 is used, the depth of field is accurately confirmed in this embodiment where the temperature detector 60 is used. Further, by also correcting the photometric value obtained by the photometry of field light transmitted by the liquid crystal focusing screen 1, temperature errors due to the focusing screen itself such as aged deterioration change of the liquid crystal never occur. As a result, the correction is performed so that the depth of field and photometry are not affected.

Regarding the temperature detection, prior art devices are known which incorporate a temperature detecting device in the vicinity of a photometric device or of a CCD device provided in the camera body. However, since a considerable temperature gradient is generated in the camera body depending on the environment where the camera is used, in cameras where liquid crystal focusing screens are used, the diffusion factor error due to temperature change cannot be corrected without the temperature in the vicinity of the focusing screen being measured. Displays of twisted nematic liquid crystal incorporated in cameras generally incorporate a temperature compensating circuit. However, since the correction of the driving voltage in accordance with temperature change is performed by hardware, it is impossible to perform appropriate error correction for liquid crystal whose light diffusion characteristic is varied by the driving voltage.

Figure 27:
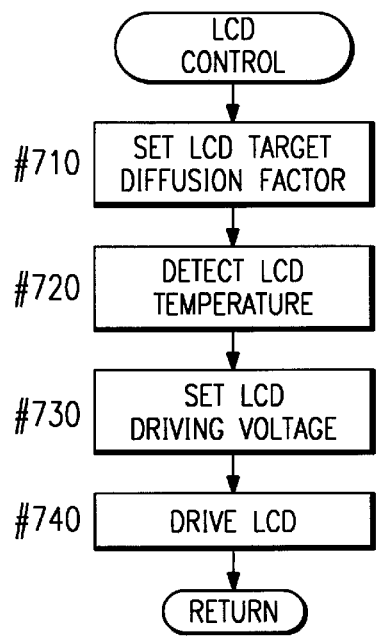
FIG. 27 is a flowchart of an LCD control subroutine (temperature detection type) executed in an eleventh embodiment of the present invention.

Referring to FIG. 27, there is shown an LCD control subroutine (temperature detection type). In this embodiment, controls other than the LCD control are performed in a manner similar to that of the above-described tenth embodiment (FIGS. 21, 22, 24 to 26).

First, in a similar manner as the above-described LCD target diffusion factor setting performed at step #320 of FIG. 23, the LCD diffusion factor is set (step #710). Then, the temperature of the liquid crystal is detected by the temperature detector 60 arranged in the vicinity of the liquid crystal focusing screen 1 (step #720). Then, the driving voltage VL of the liquid crystal is set (step #730). To set the driving voltage VL, a correcting liquid crystal driving voltage level for obtaining a target diffusion factor at that temperature (i.e. the target value set at step #710) is obtained by calculation based on a data table pre-obtained based on a relationship between the liquid crystal and diffusion factor. For example, based on a data table as shown in Table 4, the liquid crystal driving voltage level (1 to 9) is obtained for correcting the driving voltage VL based on the temperature and the LCD target diffusion factor. The liquid crystal driving voltage levels in the table imply that the higher the value of the level is, the more -necessary it is to perform correction so as to increase the driving voltage VL. In actuality, driving voltages in accordance with the diffusion factors are used as the data table. Then, the liquid crystal is driven based on the obtained driving voltage value VL (step #740).

Figures 35A, 35B:
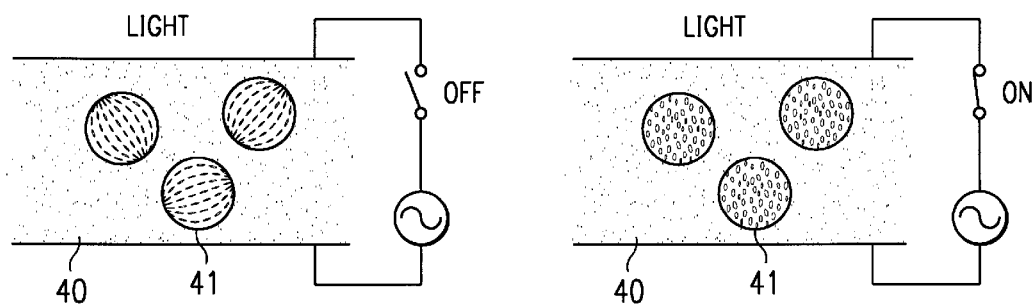
FIGS. 35A and 35B show a light diffusing mechanism of a high molecular dispersion type liquid crystal used in a twelfth embodiment of the present invention.

Subsequently, a twelfth embodiment of the present invention will be described. Similarly to the other embodiments, the liquid crystal focusing screen 1 having the liquid crystal whose light diffusion characteristic may be varied by applying a driving voltage is used in this embodiment. FIGS. 35A and 35B show an example of liquid crystal of a macromolecule dispersion type employable in this embodiment, and show a structure change between before and after the driving voltage is applied. This liquid crystal, which is known, has a light diffusion characteristic such that the diffusivity decreases as the driving voltage increases. In the figures, the reference numeral 40 represents a macromolecule polymer, and reference numeral 41 represents a crystal domain of liquid crystal. Since this liquid crystal has a high transmittance unlike the guest-host liquid crystal and the twisted nematic liquid crystal, its use for the focusing screen enables the realization of a bright finder.

Figure 36:
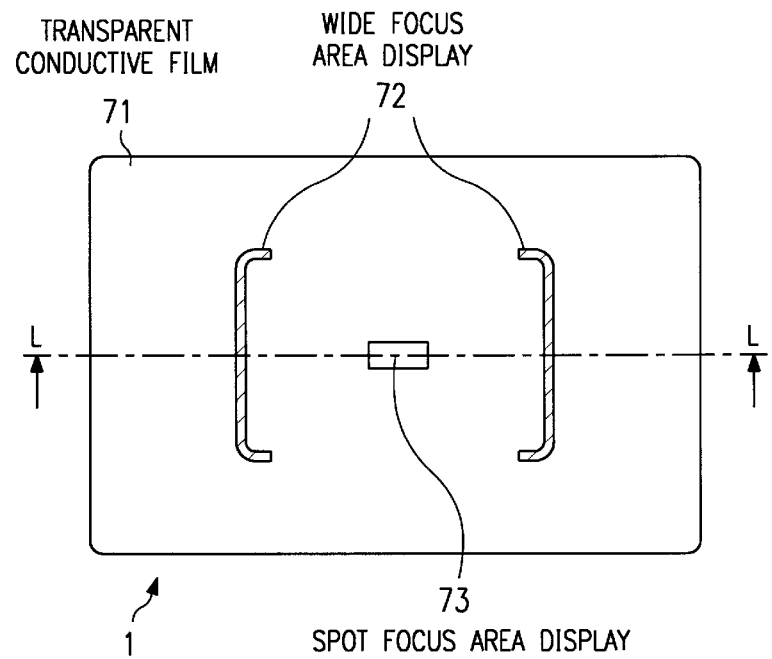
FIG. 36 is a front view showing a liquid crystal focusing screen used in the twelfth embodiment of the present invention.

It is necessary for the liquid crystal focusing screen 1 used in this embodiment to be provided with a transparent conductive film provided in accordance with the configuration of the display so as to form the electrodes of the liquid crystal. FIG. 36 shows a front view of the liquid crystal focusing screen 1. The reference numeral 71 represents a transparent conductive film, the reference numeral 72 represents a wide focus area display, and the reference numeral 73 represents a spot focus area display. No conductive film 71 is provided at the portions of the wide focus area display 72 and the spot focus area display 73. While the wide focus area display 72 and the spot focus area display are both shown in the figure, in this embodiment, the display 72 and the display 73 are changed over and displayed being superimposed within the finder. Needless to say, the display 72 and the display 73 may simultaneously be displayed.

If the liquid crystal focusing screen 1 is arranged on the focal surface of the taking lens and the pattern of at least one of the electrodes takes the form of the portion excepting the above-mentioned displays 72 and 73 and a voltage is applied across the electrode, the diffusivity of the portion excepting the portions of the displays 72 and 73 decreases, so that the boundary with the portion excepting the displays 72 and 73 is confirmed as a pattern. Moreover, if the voltage application to the area excepting the display 72 or 73 is varied according to the control aperture value, the previously-described pre-view function with which the depth of field can be confirmed is also provided.

Figure 37:
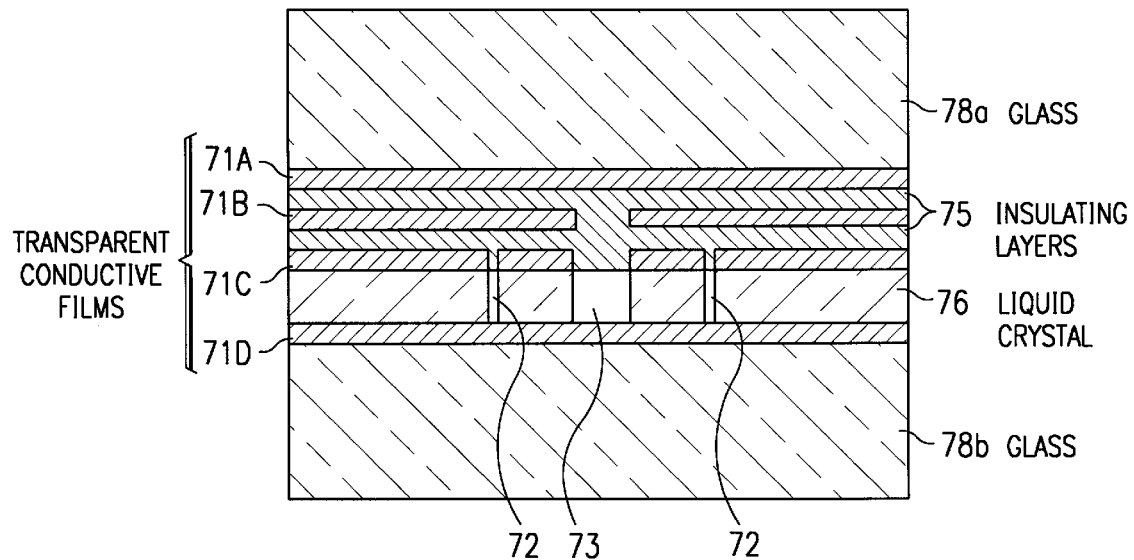
FIG. 37 is a cross-sectional view of the liquid crystal of FIG. 36 taken on line L—L.

FIG. 37 is a cross-sectional view of the liquid crystal focusing screen taken on line L—L. As shown in the figure, transparent conductive films 71A to 71D which serve as electrodes constitute multi-layers in the liquid crystal focusing screen 1. By forming multi-layer electrodes like this, only the electric field of the electrode closest to a liquid crystal 76 is actually applied to the liquid crystal 76, and the electric fields of the other electrodes are interrupted by the electrode closest to the liquid crystal 76. Thereby, as shown below, the changeover between the display 72 and the display 73 is performed with the structure shown in FIG. 37.

(1) To display only the wide focus area, a voltage is applied to the transparent conductive films 71A and 71C, and the transparent conductive films 71B and 71D are connected to ground GND. Then, the diffusivity of the portion of the display 72 increases since no electric field is applied thereto, and the diffusivities of all the other areas decrease since an electric field is applied thereto and light is not diffused thereby. As a result, only the portion of the wide focus area display 72 becomes dark.

(2) To display only the spot focus area, the driving voltage is applied to the transparent conductive films 71B and 71C, and the transparent conductive films 71A and 71D are connected to ground GND. As a result, only the spot focus area display 73 becomes dark.

(3) To display none of the both displays, the driving voltage is applied to the transparent conductive films 71A, 71B and 71C, and the transparent conductive film 71D is connected to ground GND.

(4) To display both of the displays, the driving voltage is applied only to the transparent conductive film 71C, and the transparent conductive films 71A, 71B and 71D are connected to ground GND.

Since, as described above, the obverse and reverse electrodes (transparent conductive films 71B and 71C) are formed at the portion excepting the patterns of the displays 72 and 73 and display is provided by increasing the diffusivity of the portions of the displays 72 and 73 which are selected, which focus area has been selected can be confirmed, and display is easily changed over only by changing over the electrodes. Further, since at least one surface of the electrodes is a transparent electrode having multi-layer electrode of different pattern having insulating layers 75 therebetween, a plurality of display portions may independently be controlled by controlling the voltage to each layer of the electrode.

With respect to the combinations of displaying/not displaying of the displays 72 and 73 shown in the above (1) to (4), Table 5 shows which electrode the voltage is applied to and which electrode is connected to ground GND.

Subsequently, the reason why the multi-layer electrode is formed will be explained. Dividing the electrode on a plane surface is another method of independently turning on and off a plurality of displays. In that case, a transparent conductive film is required as a conductive line from a voltage supplying portion outside the finder field to the display pattern. However, since the same voltage as that applied to the display pattern is applied to the transparent conductive film, the liquid crystal of the portion of the transparent conductive film (i.e. conductive pattern) is also viewed.

On the contrary, with the multi-layer structure as shown in FIG. 37 constituted by the transparent conductive films 71A to 71D which serve as electrode, since only the electric field of the electrode closest to the liquid crystal 76 is applied to the liquid crystal 76 and the electric fields of the other electrodes are interrupted by the electrode closest to the liquid crystal 76, the conductive pattern from the display pattern to the end surface of the liquid crystal is never viewed.

A prior art camera is known where the display is provided by use of a liquid crystal focusing screen whose light diffusion characteristic may be varied according to the driving voltage applied. For example, a camera has been proposed, in Japanese Published Utility Model Application No. S55-10982, where the liquid crystal focusing screen is divided into a pattern portion which serves as the main portion and represents a display pattern, and a portion in the periphery thereof, a voltage is applied at all times, no display pattern is viewed in the pattern portion when an output from a detector which determines whether the photographing conditions have become appropriate or not shows that the photographing condition have become appropriate, and the display pattern is viewed in other cases. However, the necessity to divide the electrode increases the cost, and the conductive pattern from the display pattern to the end surface of the liquid crystal is viewed. According to the present embodiment of the present invention, no such problems arise since the multi-layer transparent conductive films are used.

Moreover, a camera has been proposed, in Japanese Laid-open Utility Model Application No. S59-94326, where a liquid crystal focusing screen having a variable light diffusion characteristic and a liquid crystal having light absorptivity are superposed to perform both the superimpose display function and the pre-view function. However, the use of two kinds of liquid crystal increases the cost, and the finder becomes dark. According to the present embodiment of the present invention, no such problems arise since only one kind of liquid crystal (liquid crystal focusing screen 1) is used.

Figure 38:
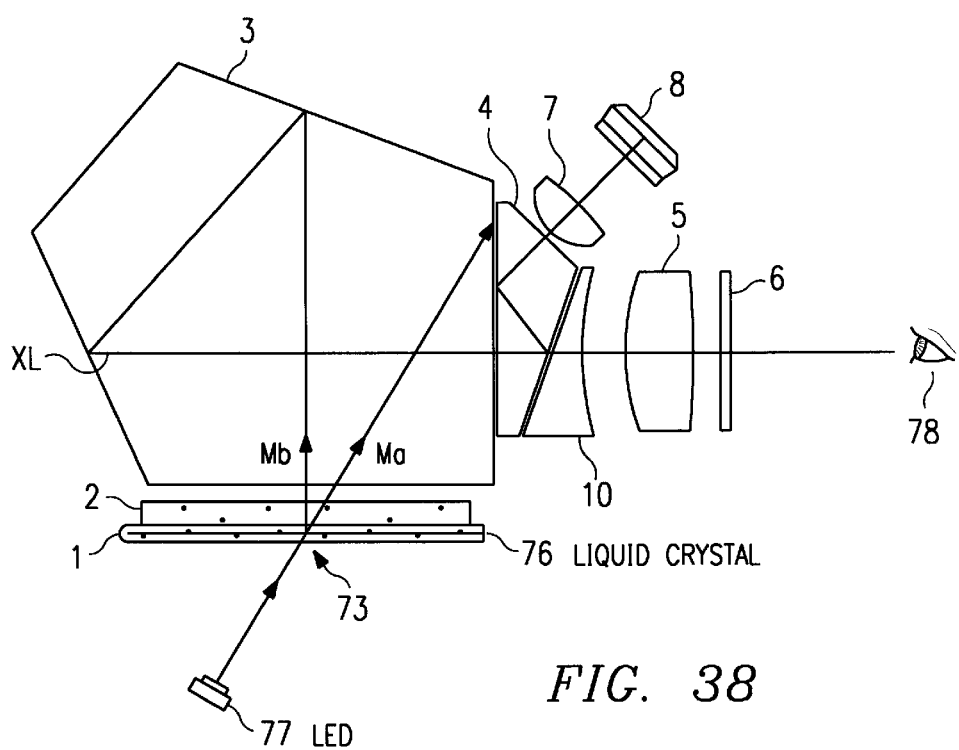
FIG. 38 is a schematic view showing the arrangement of a finder optical system having a liquid crystal illuminating LED, used in the twelfth embodiment of the present invention.

Referring to FIG. 38, there is shown the arrangement of the present embodiment where a light emitting diode (hereinafter referred to as "LED") 77 which emits light to the liquid crystal focusing screen 1 shown in FIGS. 36 and 37 is provided in a finder optical system arranged in a similar manner to that of the finder optical system of the previously-described fourth embodiment of FIG. 5.

In a condition where no light is diffused in the entire finder field by the application of the driving voltage to the liquid crystal 76 (FIG. 37), the light from the LED 77 is not diffused but advances in the direction of arrow Ma, and is not incident on the eye 78. However, if no voltage is applied only to the portion of the display (in FIG. 38, corresponding to the display 73 of FIG. 36), the diffusivity of the liquid crystal 76 increases only with respect to the portion of the display 73. As a result, the light is diffused in various directions and is partly diffused in the direction of arrow Mb to be incident on the eye 78.

When the photographic image plane is bright like in the photographing in the daytime, if the LED 77 is deactivated, the quantity of the light diffused at the portion of the display 73 and advancing in the direction of arrow Mb is smaller than the light diffused at the portion other than the portion of the display 73 and advancing in the direction of arrow Mb, since the diffusivity of the portion of the display 73 is higher than that of the other portion. As a result, only the portion of the display 73 becomes dark. On the contrary, when the photographing image plate is dark like in the photographing in the nighttime, if the LED 77 is activated, of the light emitted from the LED 77, the quantity of the light diffused at the portion of the display 73 and advancing in the direction of arrow Mb is larger than the light diffused at the portion other than the portion of the display 73 and advancing in the direction of arrow Mb, since the diffusivity of the portion of the display 73 is high. As a result, only the portion of the display 73 becomes brightly lit. With the arrangement of this embodiment, the display may be changed over in four ways: only the display 72, only the display 73, and both or none of the displays 72 and 73.

As described above, according to the present invention, the display portion becomes brightly lit when the photographic image plane is dark, and the display becomes dark when the photographic image plane is bright since of the light passing through the display portion, the quantity of light which is incident on the eye is small. As a result, the superimposed display provided within the finder can be viewed both in the light and in the dark. Moreover, by also using a pre-view function by means of a portion other than the display portion, display may be provided within the finder image plane only by use of the liquid crystal pre-view apparatus without any need to use another component. As a result, the finder becomes bright since no light is lost, and the smaller number of components decreases the cost.

Figure 39:
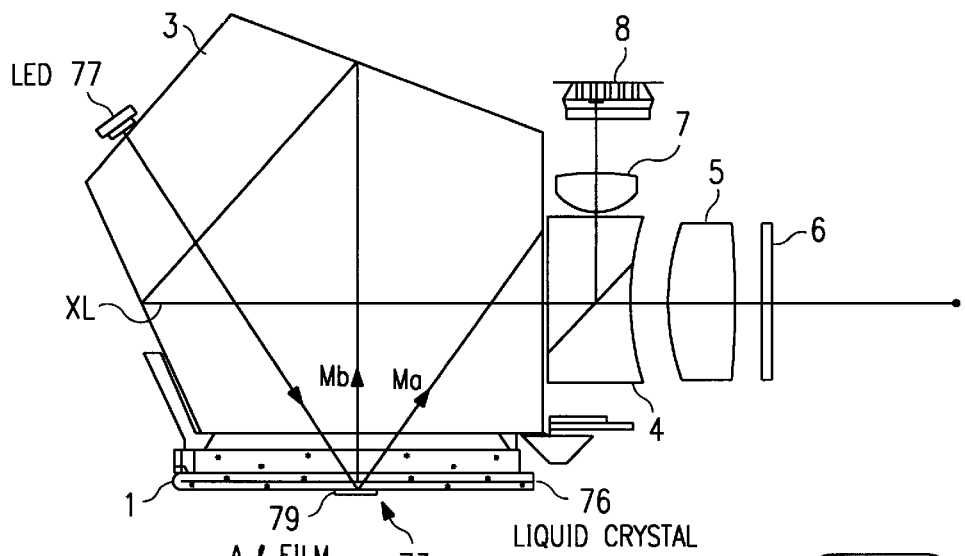
FIG. 39 is a schematic showing the arrangement of a finder optical system having a liquid crystal illuminating LED, used in a thirteenth embodiment of the present invention.

Referring now to FIG. 39, there is shown a thirteenth embodiment of the present invention where the LED 77 which emits light to the liquid crystal focusing screen 1 of FIGS. 36 and 37 is provided in a finder optical system arranged in a similar manner to the above-described second embodiment of FIG. 3. This embodiment is characterized in that the LED 77 is arranged at an upside of the pentagonal roof prism 3 and that an aluminum (Al) film 79 which forms the configuration of the display 73 (that is, the aluminum film 79 and the display 73 are formed to be of the same size and configuration) is provided at an underside of the liquid crystal focusing screen 1.

When the photographic image plane is bright like in the photographing in the daytime, since the aluminum film 79 intercepts the light from the taking lens, the portion of the aluminum film 79 which forms the display 73 becomes dark but is clearly viewed at a high contrast. In this case, the LED 77 is deactivated. Regarding the liquid crystal focusing screen 1, the diffusivity thereof may be decreased so that no light is diffused thereby. In contrast, when the photographic image plane is dark like in the photographing in the nighttime, similarly to the above-described twelfth embodiment, the driving voltage is applied to the portion other than the portion of the display 73, and the LED 77 is activated. At this time, since the diffusivity of the liquid crystal 76 increases with respect to only the portion of the display 73, the light emitted from the LED 77 and reflected by the aluminum film 79 is diffused in various directions at the portion of the display 73 and is partly diffused in the direction of arrow Mb to be incident on the eye 78. As a result, only the portion of the display 73 becomes brightly lit. With the arrangement of this embodiment, the display may be changed over in two manners: only the display 73, and both the displays 72 and 73.

As described above, according to the arrangement of this embodiment, when the photographic image plane is dark, the display portion brightly lit by the irradiation of the light reflected by the portion of the aluminum film 79 is viewed as a radiating display pattern, so that the layout which is ordinary not clearly viewed in the dark is clearly viewed. When the photographic image plane is bright, since the aluminum film 79 intercepts the light, the display becomes dark. As a result, the superimposed display within the finder is clearly viewed both in the light and in the dark. Moreover, by also using a pre-view function by means of a portion other than the display portion, display may be provided within the finder image plane only by use of the liquid crystal pre-view apparatus without any need to use another part. As a result, the finder becomes bright since no light is lost, and the smaller number of components decreases the cost. Moreover, when it is difficult for spatial reasons to arrange the LED 77 at an underside of the liquid crystal focusing screen 1 like in the above-described twelfth embodiment, the arrangement of the LED 77 in this embodiment may be appropriate. It is impossible to change over the display 73 between ON and OFF since it is constituted by the aluminum film 79; however, it is unnecessary to change over the driving voltage to the liquid crystal of the display portion between ON and OFF.

Figure 40:
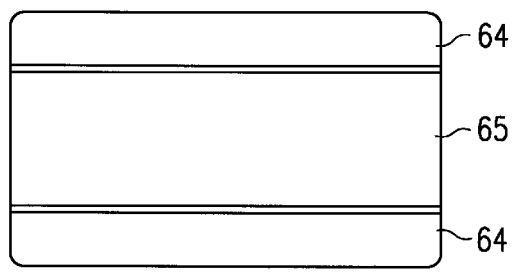
FIG. 40 is a front view showing a liquid crystal focusing screen usable also for panoramic photography, used in a fourteenth embodiment of the present invention.

Referring to FIG. 40, there is shown a front view of a liquid crystal display plate used in a fourteenth embodiment of the present invention. This liquid crystal display plate is designed to show a photographic area by use of the difference between the diffusivity of liquid crystal, and the changeover between the full-size photography and the panoramic photography is possible. Of a photographic area for the full-size photography, an area 65 is a photographic area for the panoramic photography. The other areas are non-photographic areas in panoramic photographing.

The area 64 and the area 65 are constituted by separate transparent conductive films and are controlled by the same voltage in full-size photographing, whereas in panoramic photographing, only the diffusivity of the area 64 increases since the electrode of the area 64 is connected to ground GND. It is understood that the area 64 is outside the photographic area since the image becomes blurred and darker as the diffusivity increases. Moreover, by varying the applied driving voltage according to the control aperture value, the electronic pre-view function with which the depth of field can be confirmed as described above is also provided. While two photographic areas are changed over in this embodiment, a plurality of photographic areas may be displayed by dissimilating the diffusivity outside the photographic area and the diffusivity in the photographic area in a camera having a plurality of photographic areas.

Subsequently, a fifteenth embodiment of the present invention will be described which is of a refreshing type (a type where the time of the finder observation and the time of photometry are shifted). This embodiment is characterized in that in a camera where photometry is performed by a photometric apparatus using light transmitted by the liquid crystal focusing screen 1 having a variable light diffusion characteristic, when the release operation is performed, photometry is performed, through the control by the CPU 30, by the photometric apparatus 8 by setting the light diffusion characteristic of the liquid crystal to a predetermined diffusivity (e.g. diffusivity in accordance with the open aperture value of the taking lens, the exit pupil position [exit pupil length] of the taking lens and the temperature in the vicinity of the focusing screen) before the exposure control is performed.

In this embodiment, the predetermined diffusivity is set to a condition where the driving voltage applied is maximum and no light diffusion occurs, that is, to zero. While in the previously-described tenth embodiment, it is possible after the AE calculation to display the photometric value before the release operation, in the fifteenth embodiment, no photometric value is displayed since photometry is performed after the release operation and before the exposure.

In the case where photometry is performed by using light having passed through the liquid crystal focusing screen 1 having a variable diffusion factor, if the photometry is performed by use of a decentered photometric optical system, it is impossible to correctly perform photometry when the liquid crystal focusing screen has no diffusivity (that is, when the driving voltage is maximum). Moreover, if the diffusivity of the liquid crystal focusing screen 1 is set to the predetermined value only during photometry, when photometry is frequently performed, the finder view flickers. This deteriorates the finder view. However, by performing photometry after the release operation and before the exposure like in this embodiment, no flickering of the finder view is recognized by the user, and photometry is accurately performed without the finder view being deteriorated.

Figure 41:
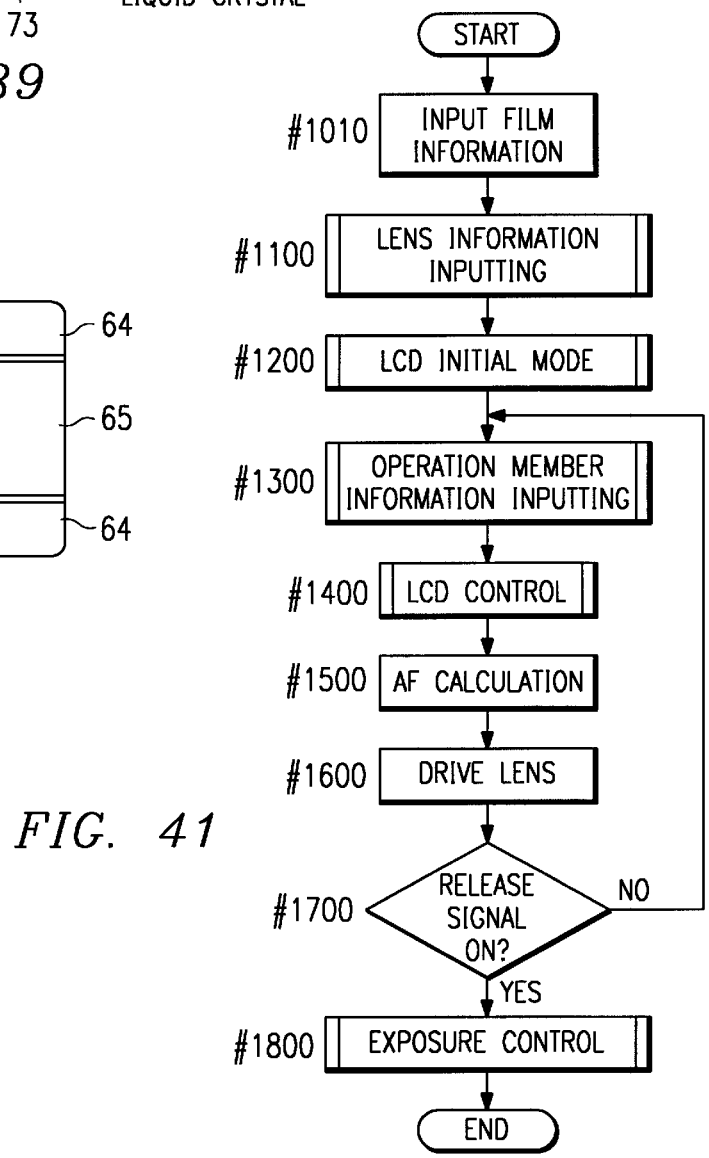
FIG. 41 is a flowchart of a main routine (refreshing type) of a fifteenth embodiment of the present invention.

Referring now to the flowcharts of FIGS. 41 to 43, the control operation of this embodiment will be described. The arrangement of this embodiment is the same as that of the previously-described tenth embodiment except that the control operation is partly different. FIG. 41 shows the flowchart of a main routine. When the main switch of the camera is turned on, similarly to the tenth embodiment (steps #10 and #100 of FIG. 21), film information inputting (step #1010) and lens information inputting (step #1100) are performed.

Then, similarly to the tenth embodiment (steps #300, #200, #500, #30A, #300B, #500A of FIG. 21), the LCD initial mode subroutine, the operation member information inputting subroutine, the LCD control subroutine, the AF calculation, the lens drive, and the determination of whether the release signal is present or not are performed in this order (steps #1200, #1300, #1400, #1500, #1600 and #1700). In the stage of the LCD control at step #1400, since the AE calculation has not been performed yet, the setting of the LCD target diffusion factor is performed based on the aperture value (for example, a set aperture value by an operation by the user in the aperture-priority mode [A mode]) inputted at the time of the operation member information inputting. That is, the depth of field is confirmed by liquid crystal control not based on an actual control but based on an aperture value set by an operation by the user.

When it is determined that the release signal is present at step #1700, the process returns to step #1300. When it is determined that the release signal is not present, the process proceeds to step #1800, where the exposure control is performed. Then, the process returns. Now, the exposure control subroutine executed at step #1800 will be described since it is different from that of the tenth embodiment (step #600 of FIG. 21, FIG. 26).

FIG. 42 shows the exposure control subroutine (refreshing type) performed at step #1800 of FIG. 41. First, the diffusivity of the liquid crystal is set to a diffusion factor at which photometry is possible (for example, at a large value such as a diffusion angle θ=10° at which light diffusion occurs) (step #1810). Then, photometry is performed by use of field light having passed through the liquid crystal focusing screen (step #1820). At step #1830, a subsequently-described AE calculation subroutine (FIG. 43) is executed. In this subroutine, appropriate AV and TV values are calculated based on the photometric value obtained by the photometric apparatus 8. The AV value (control aperture value AVC) and the TV value (control TV) obtained in this subroutine are used for actual exposure (step #1850).

After the mirror is moved up at step #1840, similarly to steps #620, #630 and #640 of FIG. 26 in the tenth embodiment, exposure is performed (step #1850), the mirror is moved down (step #1860), and the film is advanced (step #1870). Then, the process returns.

Referring to FIG. 43, there is shown the AE calculation subroutine executed at step #1830 of FIG. 42. The description of this AE calculation subroutine will not be given since it is the same as the AE calculation subroutine of FIG. 25 executed in the tenth embodiment except that the LCD diffusion factor detection (step #420) is not performed.

Obviously, many modifications and variations of the present invention are possible in light of the above teachings. It is therefore to be understood that within the scope of the appended claims, the invention may be practiced other than as specifically described.

TABLE 1

| | Driving Voltage VL in Brightness Priority Mode | | | |
|---|---|---|---|---|
| PV | Large | Middle | Small | LC [Reflecting telephoto lens] |
| VL | Vmax-Vp | Vmax | Vmax-Vp | Vmax-VR |

TABLE 2

| | gi(PV,VL) when i = 1,2 | | |
|---|---|---|---|
| | | PV | |
| | | Short | Long |
| VL | Large | + | − |
| | Small | − | − |

TABLE 3

| | gi(PV,VL) when i = 3,4 | | |
|---|---|---|---|
| | | PV | |
| | | Short | Long |
| VL | Large | − | + |
| | Small | − | − |

TABLE 4

Relationship between
LCD target diffusion factor and temperature

|  |  | Temperature | | |
|---|---|---|---|---|
|  |  | Low temperature | Ordinary temperature | High temperature |
| LCD target diffusion factor | Small | 9 | 8 | 7 |
|  | Middle | 6 | 5 | 4 |
|  | Large | 3 | 2 | 1 |

TABLE 5

Relation between
wide focus area and spot focus area

|  |  | Wide focus area | |
|---|---|---|---|
|  |  | Displayed | Not displayed |
| Spot focus area | Displayed | ON-C GND-ABD | ON-BC GND-AD |
|  | Not displayed | ON-AC GND-BD | ON-ABC GND-D |

What is claimed is:

1. A camera for use with an interchangeable taking lens, said camera comprising:

a focusing screen on which a subject image is formed by a taking lens attached to the camera, said focusing screen being constituted by a liquid crystal having a variable light diffusion characteristic, the variable light diffusion characteristic being controlled according to an open aperture value of the taking lens and a determined control aperture value;

a driver which drives the liquid crystal; and a controller which controls the driver to vary the light diffusion characteristic of the liquid crystal based on both the control aperture value of the taking lens and the determined open aperture value.

2. A camera as claimed in claim 1, wherein the larger the open aperture value, the larger a degree of diffusion of the liquid crystal.

3. A camera as claimed in claim 1, further comprising a lens information reader which inputs lens information including an open aperture value of an interchangeable taking lens.

4. A camera having an attached taking lens, the camera comprising:

a focusing screen on which a subject image is formed by the taking lens, said focusing screen being constituted by a liquid crystal having a variable light diffusion characteristic;

a driver which drives said liquid crystal to vary said light diffusion characteristic;

an exposure instructor capable of generating an output signal instructing start of an exposure; and a controller which controls said driver, so that the degree of diffusion of the focusing screen is set to a degree of diffusion suitable for image observation in a viewfinder prior to a signal instructing the controller to start an exposure, and which after a signal is outputted instructing the start of an exposure, the degree of diffusion is set by said controller to another degree of diffusion suitable for photometry.

5. A camera as claimed in claim 4, further comprising a photometric circuit, wherein photometry is performed by said photometric circuit after exposure is instructed by said exposure instructor but before an exposure operation is started.

6. A camera as claimed in claim 4, wherein a degree of diffusion before the signal instructing the controller to start the exposure is independent of the degree of diffusion suitable for photometry.

7. A camera having a viewfinder display and a detachably coupled taking lens, the camera comprising:

a focusing screen on which a subject image is formed by the taking lens, said focusing screen being constituted by a liquid crystal having a variable light diffusion characteristic, and said taking lens having an open aperture value;

a selector which selects one condition from among a plurality of conditions to which priority can be given to achieve a specific state of the viewfinder display; and a controller which changes the state of the viewfinder display by varying the diffusion characteristic of said liquid crystal in accordance with the condition selected by said selector using the open aperture value and a determined control aperture value.

8. A camera as claimed in claim 7, wherein said plurality of conditions include a condition to achieve brightness of the image in the viewfinder and another condition is for easiness of focus discrimination.

9. A camera as claimed in claim 7, wherein said plurality of conditions include a condition to achieve brightness of the image in the viewfinder and another condition for easiness of depth of field confirmation.

10. A camera as claimed in claim 9, wherein a degree of diffusion is zero in a brightness priority condition.

11. A camera as claimed in claim 9, wherein a condition is provided where a degree of diffusion is set which is intermediate between a degree of diffusion of a brightness priority condition and a degree of diffusion of an easiness priority condition.

12. A camera as claimed in claim 7, further comprising a member for selecting one of the plurality of conditions, wherein a condition to select a degree of diffusion is selectable by manual operation of said member.

13. A camera as claimed in claim 7, wherein said plurality of conditions include depth-of-field, focusing, and brightness.

14. A camera for use with an interchangeable taking lens, said camera comprising:

a focusing screen on which a subject image is formed by a taking lens attached to the camera, said focusing screen being constituted by a liquid crystal having a variable light diffusion characteristic, the variable light diffusion characteristic being controlled according to an open aperture value of the taking lens and a determined control aperture value, wherein the open aperture value and the control aperture value are not equal;

a driver which drives the liquid crystal; and a controller which controls the driver to vary the light diffusion characteristic of the liquid crystal based on both the control aperture value of the taking lens and the determined open aperture value.

* * * * *